US012799245B2

(12) United States Patent
Bouyahyi et al.

(10) Patent No.: US 12,799,245 B2
(45) Date of Patent: Nov. 17, 2026

(54) SOLUTION PROCESS FOR PRODUCTION OF HALIDE- OR TERTIARY AMINE-FUNCTIONALIZED POLYOLEFINS

(71) Applicant: SABIC GLOBAL TECHNOLOGIES B.V., Bergen op Zoom (NL)

(72) Inventors: Miloud Bouyahyi, Eindhoven (NL); Lidia Jasinska-Walc, Veldhoven (NL); Robbert Duchateau, Roostenlaan (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 689 days.

(21) Appl. No.: 18/035,815

(22) PCT Filed: Nov. 22, 2021

(86) PCT No.: PCT/EP2021/082510
§ 371 (c)(1),
(2) Date: May 8, 2023

(87) PCT Pub. No.: WO2022/106688
PCT Pub. Date: May 27, 2022

(65) Prior Publication Data

US 2023/0399425 A1 Dec. 14, 2023

(30) Foreign Application Priority Data

Nov. 23, 2020 (EP) .................................... 20209240

(51) Int. Cl.

| | |
|---|---|
| ***C08F 4/76*** | (2006.01) |
| ***C08F 4/52*** | (2006.01) |
| ***C08F 4/64*** | (2006.01) |
| ***C08F 210/06*** | (2006.01) |
| ***C08F 210/14*** | (2006.01) |
| ***C08F 214/02*** | (2006.01) |
| ***C08F 214/16*** | (2006.01) |
| ***C08F 226/02*** | (2006.01) |

(52) U.S. Cl.
CPC .............. *C08F 210/14* (2013.01); *C08F 4/52* (2013.01); *C08F 4/76* (2013.01); *C08F 210/06* (2013.01); *C08F 226/02* (2013.01); *C08F 2410/04* (2013.01)

(58) Field of Classification Search
CPC .... C08F 210/02; C08F 210/06; C08F 214/02; C08F 214/14; C08F 214/16; C08F 226/02; C08F 4/64913
See application file for complete search history.

(56) References Cited

U.S. PATENT DOCUMENTS

| | | | | |
|---|---|---|---|---|
| 8,916,663 | B2 * | 12/2014 | Nozaki | C08F 18/02 526/348 |
| 11,396,565 | B2 * | 7/2022 | Jasinska-Walc | C08F 4/65912 |
| 11,447,585 | B2 * | 9/2022 | Bouyahyi | C08F 210/06 |
| 11,466,109 | B2 * | 10/2022 | Bouyahyi | C08F 210/06 |
| 11,472,900 | B2 * | 10/2022 | Bouyahyi | C08F 8/42 |
| 12,384,946 | B2 * | 8/2025 | Jasinska-Walc | C09J 5/06 |
| 2024/0018284 | A1 * | 1/2024 | Bouyahyi | C08F 210/14 |

FOREIGN PATENT DOCUMENTS

| | | | | |
|---|---|---|---|---|
| CN | 103483482 A | | 1/2014 | |
| CN | 103897078 B | | 7/2016 | |
| EP | 3034545 A1 | | 6/2016 | |
| WO | 2019071102 A1 | | 4/2019 | |
| WO | WO-2019122456 A1 | * | 6/2019 | C08F 220/04 |

OTHER PUBLICATIONS

Chen, J.; Motta, A.; Wang, B., Gao, Y.; Marks, T.J. Angew. Chem. Int. Ed. 2019, 58, 7030-7034. (Year: 2019).*

Bochmann, M., "The Chemistry of Catalyst Activation: The Case of Group 4 Polymerization Catalysts", Organometallics, 2010, 29, 4711-4740.

Chen et al., "Cocatalysts for Metal-Catalyzed Olefin Polymerization: Activators, Activation Processes, and Structure- Activity Relationships," Chemical Reviews; 2000, pp. 1391-1434, vol. 100, No. 4.

Goretzki, R. et al. "Homogeneous and heterogeneous metallocene/MAO-catalyzed polymerization of functionalized olefins", Marcomol. Chem. Phys. 1999, 200, 881-886.

International Search Report for International Application No. PCT/EP2021/082510, International Filing Date Nov. 22, 2021, Date of Mailing May 11, 2022, 7 pages.

Radlauer, M. et al., "Bimetallic Coordination Insertion Polymerization of Unprotected Polar Monomers: Copolymerization of Amino Olefins and Ethylene by Dinickel Bisphenoxyiminato Catalysts" Journal of the American Chemical Society (2013), 135(10), 3784-3787.

Wang Jing et al., "Investigation on terpolymer of ethylene/propylene/[omega]-bromo-[alpha]-olefins catalyzed by titanium complexes", Journal of Material Science, vol. 52, No. 10, Feb. 2, 2017, pp. 5981-5991.

Written Opinion for International Application No. PCT/EP2021/082510, International Filing Date Nov. 22, 2021, Date of Mailing May 11, 2022, 12 pages.

Marques, M. et al., "Polymerization with TMA-Protected Polar Vinyl Comonomers. I. Catalyzed by Group 4 Metal 1 Complexes with n5-type Ligands", Journal of Polymer Science Part A: Polymer Chemistry, vol. 37, No. 14, Jul. 15, 1999, pp. 2457-2469.

* cited by examiner

*Primary Examiner* — Rip A Lee
(74) *Attorney, Agent, or Firm* — CANTOR COLBURN LLP

(57) ABSTRACT

The present invention relates to a process for solution copolymerization process to produce a functionalized polyolefin using a catalyst system comprising a hafnium or zirconium complex of a polyvalent aryloxyether and a co-catalyst selected from the group: MAO, DMAO, MMAO, SMAO and ammonium salts or trityl salts of fluorated tetraarylborates.

10 Claims, No Drawings

SOLUTION PROCESS FOR PRODUCTION OF HALIDE- OR TERTIARY AMINE-FUNCTIONALIZED POLYOLEFINS

CROSS REFERENCE TO RELATED APPLICATIONS

This application is a National Stage application of PCT/EP2021/082510, filed Nov. 22, 2021, which claims the benefit of European Application No. 20209240.9, filed Nov. 23, 2020, both of which are incorporated by reference in their entirety herein.

TECHNICAL FIELD OF THE INVENTION

The present invention relates to a process to obtain functionalized polyolefin, in particular halide and tertiary amine functionalized, in a solution process, and its functionalized polyolefin.

TECHNOLOGICAL BACKGROUND OF THE INVENTION

With a share of over 50% of the total polymer market, polyolefins play a key role in our modern life and continuous requests for new materials with tailored properties at a low price. However, one of the drawbacks of polyolefins is their low adhesion to other materials such as inorganic fillers, metals, or other polymers. To overcome this problem, polyolefins have to be functionalized. Introducing only a small percentage of functionality into the polyolefin can already significantly improve surface properties and the adhesion to, and compatibility with other materials. Commercially, functionalized polyolefins are produced by post-polymerization treatments (chemical modification of unfunctionalized polyolefins by reactive extrusion or corona/flame surface treatment of processed parts. However, to obtain functionalized polyolefin products with well-defined molecular structures, uniform distribution, and/or relatively high concentrations of the functional groups, copolymerization of olefin monomers with polar functionalized olefin comonomers is required. However, the combination of polar functionalities and highly electrophilic catalysts is obviously challenging and often the functional comonomers have to be pacified by a masking agent like additionally added aluminum alkyls. An example of such a (1) protection, (2) copolymerization, (3) deprotection process is for example described in Macromol. Chem. Phys. 1999, 200, 881-886, which discloses the production of hydroxyl functionalized polyethylenes by the copolymerization of ethylene with TiBA-pre-treated alkenol comonomers. This process is highly atom inefficient and is encumbered with complex workup steps and large amounts of waste products. Alternatively, the copolymerization of olefins and masking agent-free functionalized comonomers, for example tertiary amine-functionalized olefins, have been reported. However, typically low molecular weight products have been obtained and activities of the catalysts are low and the copolymerizations are generally perform at relatively low temperatures under slurry conditions, which has important drawbacks:

- The need of a specific catalyst in order to incorporate functional comonomer in high degree;
- The solid content must be <15 wt % especially when a homogeneous catalyst is used, otherwise statics become a severe problem giving gels that retain a lot of diluent.
- Reactor fouling occurring when using homogeneous single-site catalysts at temperatures below the crystallization temperature of the polymer being formed;
- Precipitated polymer retains a large fraction of unreacted functional comonomer;
- Deprotection is difficult once polymer has precipitated.

However, this process can also be realized under solution conditions. However the following drawback appears:

- Catalysts are not thermally stable, leading to low catalyst yields;
- Only low MW polymers are produced with low isotacticity for the functionalized polypropylenes.

Therefore, there is a need for a process to produce functionalized polyolefins that overcome at least one of this drawbacks.

SUMMARY

This object is achieved by the present invention. Accordingly, the present invention relates to a process for solution copolymerization to obtain a functionalized polyolefin comprising at least the following step:

A copolymerization step of at least one olefin monomer and at least one functionalized olefin monomer in the presence of a catalyst system, wherein the olefin monomer is represented by $CHR^1{=}CHR^2$, wherein $R^1$ and $R^2$ are each independently chosen from hydrogen or an alkyl group having 1 to 6 carbon atoms, wherein $R^1$ and $R^2$ may together form a ring structure, wherein the functionalized olefin monomer is represented by the structure according to Formula (I):

(I)

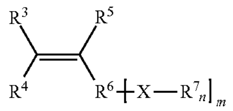

wherein $R^3$, $R^4$, and $R^5$ are each independently selected from the group consisting of H and hydrocarbyl with 1 to 16 carbon atoms, wherein $R^6$—[X—$(R^7)_n]_m$ is a polar functional group containing m heteroatom-containing functionalities X—$(R^7)_n$ in which m is an entire number between 1 and 10, preferably 1 or 2, wherein

- when n=0 (therefore there is no $R^7$), X is selected from F, Cl, Br, I, or
- when n=2, X is N and each of the 2 $R^7$ are independently selected from the group of hydrocarbyls with 1 to 16 carbon atoms, wherein $R^6$ is either —C($R^8$)($R^9$)— or a plurality of —C($R^8$)($R^9$)— groups, wherein $R^8$ and $R^9$ are each independently selected from the group consisting of H or hydrocarbyl with 1 to 16 carbon atoms and $R^6$ comprises 1 to 10 carbon atoms, wherein $R^4$ and $R^6$ may together form a ring structure that is functionalized with one or multiple X—$(R^7)_n$, where X is attached to either the main chain or side chain of $R^6$, and wherein the catalyst system comprises

- a hafnium or zirconium complex of a polyvalent aryloxyether selected from the group: bis((2-oxoyl-3-(1,2,3,4,6,7,8,9-octahydroanthracen-5-yl)-5-(methyl)phenyl)-2-phenoxy)-1,3-propanediylhafnium (IV) dimethyl, bis((2-oxoyl-3-(1,2,3,4,6,7,8,9-octahydroanthracen-5-yl)-5-(methyl)phenyl)-2-phenoxy)-1,3-propanediylhafnium (IV) dichloride, bis((2-oxoyl-3-(1,2,3,4,6,7,8,9-octahydroanthracen-5-yl)-5-(methyl)phenyl)-2-phenoxy)-1,3-propanediylhafnium (IV) dibenzyl, bis((2-oxoyl-3-(dibenzo-1H-pyrrole-1-yl)-5-(methyl)phenyl)-2-phenoxy)-1,3-propanediylhafnium (IV) dimethyl, bis((2-oxoyl-3-(dibenzo-1H-pyrrole-1-yl)-5-(methyl)phenyl)-2-phenoxy)-1,3-propanediylhafnium (IV) dichloride, bis((2-oxoyl-3-(dibenzo-1H-pyrrole-1-yl)-5-(methyl)phenyl)-2-phenoxy)-1,3-propanediylhafnium (IV) dibenzyl, bis((2-oxoyl-3-(1,2,3,4,6,7,8,9-octahydroanthracen-5-yl)-5-(methyl)phenyl)-2-phenoxymethyl)-1,4-butanediylhafnium (IV) dimethyl, bis((2-oxoyl-3-(1,2,3,4,6,7,8,9-octahydroanthracen-5-yl)-5-(methyl)phenyl)-2-phenoxymethyl)-1,4-butanediylhafnium (IV) dichloride, bis((2-oxoyl-3-(1,2,3,4,6,7,8,9-octahydroanthracen-5-yl)-5-(methyl)phenyl)-2-phenoxymethyl)-1,4-butanediylhafnium (IV) dibenzyl, bis((2-oxoyl-3-(dibenzo-1H-pyrrole-1-yl)-5-(methyl)phenyl)-2-phenoxymethyl)-1,4-butanediylhafnium (IV)dimethyl, bis((2-oxoyl-3-(dibenzo-1H-pyrrole-1-yl)-5-(methyl)phenyl)-2-phenoxymethyl)-1,4-butanediylhafnium (IV) dichloride, bis((2-oxoyl-3-(dibenzo-1H-pyrrole-1-yl)-5-(methyl)phenyl)-2-phenoxymethyl)-1,4-butanediylhafnium (IV) dibenzyl, bis((2-oxoyl-3-(1,2,3,4,6,7,8,9-octahydroanthracen-5-yl)-5-(methyl)phenyl)-2-phenoxy)-2,4-pentanediylhafnium (IV) dimethyl, bis((2-oxoyl-3-(1,2,3,4,6,7,8,9-octahydroanthracen-5-yl)-5-(methyl)phenyl)-2-phenoxy)-2,4-pentanediylhafnium (IV) dichloride, bis((2-oxoyl-3-(1,2,3,4,6,7,8,9-octahydroanthracen-5-yl)-5-(methyl)phenyl)-2-phenoxy)-2,4-pentanediylhafnium (IV) dibenzyl, bis((2-oxoyl-3-(dibenzo-1H-pyrrole-1-yl)-5-(methyl)phenyl)-2-phenoxy)-2,4-pentanediylhafnium (IV) dimethyl, bis((2-oxoyl-3-(dibenzo-1H-pyrrole-1-yl)-5-(methyl)phenyl)-2-phenoxy)-2,4-pentanediylhafnium (IV) dichloride, bis((2-oxoyl-3-(dibenzo-1H-pyrrole-1-yl)-5-(methyl)phenyl)-2-phenoxy)-2,4-pentanediylhafnium (IV) dibenzyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dimethyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dichloride, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dibenzyl, bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl, bis((2-oxoyl-3-(dibenzo-1H-pyrrole-1-yl)-5-(methyl)phenyl)-2-phenoxymethyl)-methylenetrans-1,2-cyclohexanediylhafnium (IV) dichloride, and bis((2-oxoyl-3-(dibenzo-1H-pyrrole-1-yl)-5-(methyl)phenyl)-2-phenoxymethyl)-methylenetrans-1,2-cyclohexanediylhafnium (IV) dibenzyl, bis((2-oxoyl-3-(dibenzo-1H-pyrrole-1-yl)phenyl)-2-phenoxy)-1,3-propylhafnium (IV) dibenzyl, bis((2-oxoyl-3-(dibenzo-1H-pyrrole-1-yl)phenyl)-2-phenoxy)-1,4-n-butylhafnium (IV) dimethyl, bis((2-oxoyl-3-(dibenzo-1H-pyrrole-1-yl)phenyl)-2-phenoxy)-1,4-n-butylhafnium (IV) dibenzyl, bis((2-oxoyl-3-(3,6-bis(1,1-dimethylethyl)-9H-carbazolyl)phenyl)-2-phenoxy)-1,3-propylhafnium (IV) dimethyl, bis((2-oxoyl-3-(3,6-bis(1,1-dimethylethyl)-9H-carbazolyl)phenyl)-2-phenoxy)-1,3-propylhafnium (IV) dibenzyl, bis((2-oxoyl-3-(3,6-bis(1,1-dimethylethyl)-9H-carbazolyl)phenyl)-2-phenoxy)-1,4-n-butylhafnium (IV) dimethyl, bis((2-oxoyl-3-(3,6-bis(1,1-dimethylethyl)-9H-carbazolyl)phenyl)-2-phenoxy)-1,4-n-butylhafnium (IV) dibenzyl, bis((2-oxoyl-3-(4-methoxy-3,5-bis(1,1-dimethylethyl)phenyl)phenyl)-2-phenoxy)-1,4-n-butylhafnium (IV) dimethyl, bis((2-oxoyl-3-(4-methoxy-3,5-bis(1,1-dimethylethyl)phenyl)phenyl)-2-phenoxy)-1,4-n-butylhafnium (IV) dibenzyl, bis((2-oxoyl-3-(dibenzo-1H-pyrrole-1-yl)phenyl)-2-phenoxy)-1,2-ethylhafnium (IV) dimethyl, bis((2-oxoyl-3-(dibenzo-1H-pyrrole-1-yl)phenyl)-2-phenoxy)-1,2-ethylhafnium (IV) dibenzyl, bis((2-oxoyl-3-(dibenzo-1H-pyrrole-1-yl)phenyl)-2-phenoxy)-1,3-propylhafnium (IV) dimethyl; preferably bis((2-oxoyl-3-(dibenzo-1H-pyrrole-1-yl)-5-(methyl)phenyl)-2-phenoxy)-2,4-pentanediylhafnium (IV) dimethyl, bis((2-oxoyl-3-(dibenzo-1H-pyrrole-1-yl)-5-(methyl)phenyl)-2-phenoxy)-2,4-pentanediylhafnium (IV) dichloride; bis((2-oxoyl-3-(dibenzo-1H-pyrrole-1-yl)-5-(methyl)phenyl)-2-phenoxy)-2,4-pentanediylzirconium (IV) dimethyl, bis((2-oxoyl-3-(dibenzo-1H-pyrrole-1-yl)-5-(methyl)phenyl)-2-phenoxy)-2,4-pentanediylzirconium (IV) dichloride, bis((2-oxoyl-3-(1,2,3,4,6,7,8,9-octahydroanthracen-5-yl)-5-(methyl)phenyl)-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-2-phenoxy)-1,3-propanediylzirconium (IV) dichloride, bis((2-oxoyl-3-(1,2,3,4,6,7,8,9-octahydroanthracen-5-yl)-5-(methyl)phenyl)-2-phenoxy)-1,3-propanediylzirconium (IV) dibenzyl, bis((2-oxoyl-3-(dibenzo-1H-pyrrole-1-yl)-5-(methyl)phenyl)-2-phenoxy)-1,3-propanediylzirconium (IV) dimethyl, bis((2-oxoyl-3-(dibenzo-1H-pyrrole-1-yl)-5-(methyl)phenyl)-2-phenoxy)-1,3-propanediylzirconium (IV) dichloride, bis((2-oxoyl-3-(dibenzo-1H-pyrrole-1-yl)-5-(methyl)phenyl)-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-2-phenoxymethyl)-1,4-butanediylzirconium (IV) dimethyl, bis((2-oxoyl-3-(1,2,3,4,6,7,8,9-octahydroanthracen-5-yl)-5-(methyl)phenyl)-2-phenoxymethyl)-1,4-butanediylzirconium (IV) dichloride, bis((2-oxoyl-3-(1,2,3,4,6,7,8,9-octahydroanthracen-5-yl)-5-(methyl)phenyl)-2-phenoxymethyl)-1,4-butanediylzirconium (IV) dibenzyl, bis((2-oxoyl-3-(dibenzo-1H-pyrrole-1-yl)-5-(methyl)phenyl)-2-phenoxymethyl)-1,4-butanediylzirconium (IV) dimethyl, bis((2-oxoyl-3-(dibenzo-1H-pyrrole-1-yl)-5-(methyl)phenyl)-2-phenoxymethyl)-1,4-butanediylzirconium (IV) dichloride, bis((2-oxoyl-3-(dibenzo-1H-pyrrole-1-yl)-5-(methyl)phenyl)-2-phenoxymethyl)-1,4-butanediylzirconium (IV) dibenzyl, bis((2-oxoyl-3-(1,2,3,4,6,7,8,9-octahydroanthracen-5-yl)-5-(methyl)phenyl)-2-phenoxy)-2,4-pentanediylzirconium (IV) dimethyl, bis((2-oxoyl-3-(1,2,3,4,6,7,8,9-octahydroanthracen-5-yl)-5-(methyl)phenyl)-2-phenoxy)-2,4-pentanediylzirconium (IV) dichloride, bis((2-oxoyl-3-(1,2,3,4,6,7,8,9-octahydroanthracen-5-yl)-5-(methyl)phenyl)-2-phenoxy)-2,4-pentanediylzirconium (IV) dibenzyl, bis((2-oxoyl-3-(dibenzo-1H-pyrrole-1-yl)-5-(methyl)phenyl)-2-phenoxy)-2,4-pentanediylzirconium (IV) dibenzyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylzirconium (IV) dimethyl, bis((2-oxoyl-3-(1,2,3,4,6,7,8,9-octahydroanthracen-5-yl)-5-

(methyl)phenyl)-2-phenoxymethyl)-methylenetrans-1,2-cyclohexanediylzirconium (IV) dichloride, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylzirconium (IV) dibenzyl, bis((2-oxoyl-3-(dibenzo-1H-pyrrole-1-yl)-5-(methyl)phenyl)-2-phenoxymethyl)-methylenetrans-1,2-cyclohexanediylzirconium (IV) dimethyl, bis((2-oxoyl-3-(dibenzo-1H-pyrrole-1-yl)-5-(methyl)phenyl)-2-phenoxymethyl)-methylenetrans-1,2-cyclohexanediylzirconium (IV) dichloride, and bis((2-oxoyl-3-(dibenzo-1H-pyrrole-1-yl)-5-(methyl)phenyl)-2-phenoxymethyl)-methylenetrans-1,2-cyclohexanediylzirconium (IV) dibenzyl, bis((2-oxoyl-3-(4-methoxy-3,5-bis(1,1-dimethylethyl)phenyl)phenyl)-2-phenoxy)-1,4-n-butyizirconium (IV) dimethyl, bis((2-oxoyl-3-(4-methoxy-3,5-bis(1,1-dimethylethyl)phenyl)phenyl)-2-phenoxy)-1,4-n-butylzirconium (IV) dibenzyl, bis((2-oxoyl-3-(dibenzo-1H-pyrrole-1-yl)phenyl)-2-phenoxy)-1,2-ethyizirconium (IV) dimethyl, bis((2-oxoyl-3-(dibenzo-1H-pyrrole-1-yl)phenyl)-2-phenoxy)-1,2-ethylzirconium (IV) dibenzyl, bis((2-oxoyl-3-(dibenzo-1H-pyrrole-1-yl)phenyl)-2-phenoxy)-1,3-propylzirconium (IV) dimethyl, bis((2-oxoyl-3-(dibenzo-1H-pyrrole-1-yl)phenyl)-2-phenoxy)-1,3-propylzirconium (IV) dibenzyl, bis((2-oxoyl-3-(dibenzo-1H-pyrrole-1-yl)phenyl)-2-phenoxy)-1,4-n-butylzirconium (IV) dimethyl, bis((2-oxoyl-3-(dibenzo-1H-pyrrole-1-yl)phenyl)-2-phenoxy)-1,4-n-butylzirconium (IV) dibenzyl, bis((2-oxoyl-3-(3,6-bis(1,1-dimethylethyl)-9H-carbazolyl)phenyl)-2-phenoxy)-1,3-propylzirconium (IV) dimethyl, bis((2-oxoyl-3-(3,6-bis(1,1-dimethylethyl)-9H-carbazolyl)phenyl)-2-phenoxy)-1,3-propylzirconium (IV) dibenzyl, bis((2-oxoyl-3-(3,6-bis(1,1-dimethylethyl)-9H-carbazolyl)phenyl)-2-phenoxy)-1,4-n-butylzirconium (IV) dimethyl, bis((2-oxoyl-3-(3,6-bis(1,1-dimethylethyl)-9H-carbazolyl)phenyl)-2-phenoxy)-1,4-n-butylzirconium (IV) dibenzyl; (OC-6-33)-[[2,2'''-[1,4-Butanediylbis(oxy-κO)]bis[3",5',5"-tris(1,1-dimethylethyl)[1,1:3',1"-terphenyl]-2'-olato-κO]](2-)]bis(phenylmethyl)hafnium, (OC-6-33)-[[2,2'''-[1,4-Butanediylbis(oxy-κO)]bis[3",5',5"-tris(1,1-dimethylethyl)[1,1:3,1"-terphenyl]-2'-olato-κO]](2-)]bis(phenylmethyl)zirconium preferably bis((2-oxoyl-3-(dibenzo-1H-pyrrole-1-yl)-5-(methyl)phenyl)-2-phenoxy)-2,4-pentanediylzirconium (IV) dimethyl, bis((2-oxoyl-3-(dibenzo-1H-pyrrole-1-yl)-5-(methyl)phenyl)-2-phenoxy)-2,4-pentanediylzirconium (IV) dichloride and a co-catalyst selected from the group: MAO, DMAO, MMAO, SMAO or ammonium salts or trityl salts of fluorated tetraarylborates, preferably MAO, MMAO, and optionally, a scavenger selected from the group: trimethyl aluminum, triethyl aluminum, triisobutyl aluminum, trihexyl aluminum, trioctyl aluminum and optionally, a chain transfer agent selected from the group: dihydrogen or $AlR^{10}_3$, $BR^{10}_3$ or $MgR^{10}_2$ or $ZnR^{10}_2$, where each $R^{10}$ is independently selected from hydrogen or hydrocarbyl.

In an embodiment, the at least one olefin monomer is selected from the group consisting of ethylene, propylene, 1-butene, 3-methyl-1-butene, 1-pentene, 4-methyl-1-pentene, 1-hexene, vinyl cyclohexane, 1-octene, norbornene, vinylidene-norbornene, ethylidene-norbornene, or wherein the at least one olefin monomer is propylene and/or 1-hexene.

In an embodiment, the at least one the functionalized olefin monomers is selected from the group comprising: allyl chloride, allyl bromide, 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-dibromo-1-hexene, 6,6-diiodo-1-hexene, 5-bromo-5-methyl-1-hexene, 5-chloro-5-methyl-1-hexene, 7-bromo-1-heptene, 7-iodo-1-heptene, 6-bromo-1-heptene, 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-heptene, 7,8-diiodo-1-heptene, 11-bromo-1-undecene, 11-chloro-1-undecene, 11-iodo-1-undecene, 5-chloro-bicyclo(2.2.1)hept-2-ene, 5-bromo-bicyclo(2.2.1)hept-2-ene, 5-bromomethyl-bicyclo(2.2.1)hept-2-ene, 5-chloromethyl-bicyclo(2.2.1)hept-2-ene, 5-iodomethyl-bicyclo(2.2.1)hept-2-ene, 5-(2-bromoethyl)-bicyclo(2.2.1)hept-2-ene, 5-(2-chloroethyl)-bicyclo(2.2.1)hept-2-ene, 5-(3-bromopropyl)-bicyclo(2.2.1)hept-2-ene, 5-(3-bromopropyl)-bicyclo(2.2.1)hept-2-ene, N,N-diethyl-N-(butenyl)amine, N,N-di-n-propyl-N-(butenyl)amine, N,N-di-isopropyl-N-(butenyl)amine, N,N-diethyl-N-(pentenyl)amine, N,N-di-n-propyl-N-(pentenyl)amine, N,N-di-isopropyl-N-(pentenyl)amine, N,N-di-isopropyl-N-(3-methyl-5-hexenyl)amine, N,N-diethyl-N-(hexenyl)amine, N,N-di-isopropyl-N-(hexenyl)amine, N,N-di-n-propyl-N-(hexenyl)amine, N,N-diethyl-N-(heptenyl)amine, N,N-di-isopropyl-N-(heptenyl)amine, N,N-di-n-propyl-N-(heptenyl)amine, N,N-diethyl-N-(octenyl)amine, N,N-di-n-propyl-N-(octenyl)amine, N,N-di-isopropyl-N-(octenyl)amine, N,N-diethyl-N-(undecenyl)amine, N,N-di-n-propyl-N-(undecenyl)amine, N,N-di-isopropyl-N-(undecenyl)amine, 5-norbornene-2-N,N-diethylamine, 5-norbornene-2-N,N-(diethyl)methylamine, 5-norbornene-2-N,N-di(n-propyl)amine, 5-norbornene-2-N,N-(diisopropyl)methylamine.

Preferably, the functionalized olefin monomer is selected from the group comprising: 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-diiodo-1-hexene, 5-bromo-5-methyl-1-hexene, 5-chloro-5-methyl-1-hexene, 7-bromo-1-heptene 7-iodo-1-heptene 6-bromo-1-heptene 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-octene, 7,8-diiodo-1-octene, 11-bromo-1-undecene, 5-chloro-bicyclo(2.2.1)hept-2-ene, 5-bromo-bicyclo(2.2.1)hept-2-ene, 5-bromomethyl-bicyclo(2.2.1)hept-2-ene, 5-chloromethyl-bicyclo(2.2.1)hept-2-ene, 5-iodomethyl-bicyclo(2.2.1)hept-2-ene, 5-(2-bromoethyl)-bicyclo(2.2.1)hept-2-ene, 5-(2-chloroethyl)-bicyclo(2.2.1)hept-2-ene, 5-(3-bromopropyl)-bicyclo(2.2.1)hept-2-ene, 5-(3-bromopropyl)-bicyclo(2.2.1)hept-2-ene, N,N-diethyl-N-(butenyl)amine, N,N-di-n-propyl-N-(butenyl)amine, N,N-di-isopropyl-N-(butenyl)amine, N,N-diethyl-N-(pentenyl)amine, N,N-di-isopropyl-N-(pentenyl)amine, N,N-di-isopropyl-N-(3-methyl-5-hexenyl)amine, N,N-diethyl-N-(hexenyl) amine, N,N-diethyl-N-(heptenyl)amine.

In an embodiment, the amount of the functionalized olefin monomers in the functionalized polyolefin obtained from step b) is from 0.01 to 20 mol %, preferably from 0.02 to 15 mol % or from 0.05 to 10 mol %, or from 0.1 to 5 mol %, more preferably 0.02-2 mol %, with respect to the total molar amount of the olefin monomers and the functionalized olefin monomers in the functionalized polyolefin.

In an embodiment, a first and a second olefin monomer are used to be copolymerized with the at least one functionalized olefin monomer, wherein the first and second olefin monomer are different and wherein the amount of the first olefin monomer is from 20 to 80 mol % and the amount of second olefin monomer is from 80 to 20 mol %, based on the total molar amount of first and second olefin monomer.

In an embodiment, at least one of the olefin monomers is propylene used in an amount of at least 50 wt. %, preferably at least 60 wt. %, more preferably at least >70 wt. %, most preferably at least 80 wt. % with respect to the total weight of the olefin monomers and the functionalized olefin monomers.

In an embodiment, the first olefin is propylene or ethylene and the second olefin is 1-hexene, 1-octene or norbornene, or the first olefin is propylene and the second olefin is ethylene.

In an embodiment a functionalized copolymer is obtained, preferably a copolymer in which the first monomer is selected from the group comprising ethylene and propylene, the second monomer is functionalized monomer selected from the group comprising allyl chloride, allyl bromide, 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-dibromo-1-hexene, 6,6-diiodo-1-hexene, 5-bromo-5-methyl-1-hexene, 5-chloro-5-methyl-1-hexene, 7-bromo-1-heptene, 7-iodo-1-heptene, 6-bromo-1-heptene, 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-heptene, 7,8-diiodo-1-heptene, 11-bromo-1-undecene, 11-chloro-1-undecene, 11-iodo-1-undecene, 5-chloro-bicyclo(2.2.1)hept-2-ene, 5-bromo-bicyclo(2.2.1)hept-2-ene, 5-bromomethyl-bicyclo(2.2.1)hept-2-ene, 5-chloromethyl-bicyclo(2.2.1)hept-2-ene, 5-iodomethyl-bicyclo(2.2.1)hept-2-ene, 5-(2-bromoethyl)-bicyclo(2.2.1)hept-2-ene, 5-(2-chloroethyl)-bicyclo(2.2.1)hept-2-ene, 5-(3-bromopropyl)-bicyclo(2.2.1)hept-2-ene, 5-(3-bromopropyl)-bicyclo(2.2.1) hept-2-ene, N,N-diethyl-N-(butenyl)amine, N,N-di-n-propyl-N-(butenyl)amine, N,N-di-isopropyl-N-(butenyl) amine, N,N-diethyl-N-(pentenyl)amine, N,N-di-n-propyl-N-(pentenyl)amine, N,N-di-isopropyl-N-(pentenyl)amine, N,N-di-isopropyl-N-(3-methyl-5-hexenyl)amine, N,N-diethyl-N-(hexenyl)amine, N,N-di-isopropyl-N-(hexenyl) amine, N,N-di-n-propyl-N-(hexenyl)amine, N,N-diethyl-N-(heptenyl)amine, N,N-di-isopropyl-N-(heptenyl)amine, N,N-di-n-propyl-N-(heptenyl)amine, N,N-diethyl-N-(octenyl)amine, N,N-di-n-propyl-N-(octenyl)amine, N,N-di-isopropyl-N-(octenyl)amine, N,N-diethyl-N-(undecenyl) amine, N,N-di-n-propyl-N-(undecenyl)amine, N,N-di-isopropyl-N-(undecenyl)amine, 5-norbornene-2-N,N-diethylamine, 5-norbornene-2-N,N-(diethyl)methylamine, 5-norbornene-2-N,N-di(n-propyl)amine, 5-norbornene-2-N,N-(diisopropyl)methylamine, more preferably the functionalized copolymer is poly(ethylene-co-4-bromo-1-butene), poly(ethylene-co-4-chloro-1-butene), poly(ethylene-co-4-iodo-1-butene), poly(ethylene-co-5-bromo-1-pentene), poly (ethylene-co-5-chloro-1-pentene), poly(ethylene-co-5-iodo-1-pentene), poly(ethylene-co-5-bromo-1-hexene), poly (ethylene-co-5-chloro-1-hexene), poly(ethylene-co-5-iodo-1-hexene), poly(ethylene-co-6-bromo-1-hexene), poly (ethylene-co-6-chloro-1-hexene), poly(ethylene-co-6-iodo-1-hexene), poly(ethylene-co-7-bromo-1-heptene), poly (ethylene-co-7-chloro-1-heptene), poly(ethylene-co-7-iodo-1-heptene), poly(ethylene-co-8-bromo-1-octene), poly (ethylene-co-8-chloro-1-octene), poly(ethylene-co-8-iodo-1-octene), poly(ethylene-co-11-bromo-1-undecene), poly (ethylene-co-11-chloro-1-undecene), poly(ethylene-co-11-iodo-1-undecene), poly(ethylene-co-N,N-diethyl-N-(butenyl)amine), poly(ethylene-co-N,N-di-isopropyl-N-(butenyl)amine), poly(ethylene-co-N,N-diethyl-N-(pentenyl)amine), poly(ethylene-co-N,N-di-isopropyl-N-(pentenyl)amine), poly(ethylene-co-11-N,N-di-isopropyl-N-(3-methyl-5-hexenyl)amine), poly(ethylene-co-N,N-diethyl-N-(hexenyl)amine), poly(ethylene-co-N,N-diethyl-N-(heptenyl)amine), poly(propylene-co-4-bromo-1-butene), poly(propylene-co-4-chloro-1-butene), poly(propylene-co-4-iodo-1-butene), poly(propylene-co-5-bromo-1-pentene), poly(propylene-co-5-chloro-1-pentene), poly(propylene-co-5-iodo-1-pentene), poly(propylene-co-5-bromo-1-hexene), poly(propylene-co-5-chloro-1-hexene), poly(propylene-co-5-iodo-1-hexene), poly(propylene-co-6-bromo-1-hexene), poly(propylene-co-6-chloro-1-hexene), poly(propylene-co-6-iodo-1-hexene), poly(propylene-co-7-bromo-1-heptene), poly(propylene-co-7-chloro-1-heptene), poly(propylene-co-7-iodo-1-heptene), poly(propylene-co-8-bromo-1-octene), poly(propylene-co-8-chloro-1-octene), poly(propylene-co-8-iodo-1-octene), poly(propylene-co-11-bromo-1-undecene), poly(propylene-co-11-chloro-1-undecene), poly(propylene-co-11-iodo-1-undecene), poly(propylene-co-N,N-diethyl-N-(butenyl)amine), poly(propylene-co-N,N-di-isopropyl-N-(butenyl)amine), poly(propylene-co-N,N-diethyl-N-(pentenyl)amine), poly(propylene-co-N,N-di-isopropyl-N-(pentenyl)amine), poly(propylene-co-11-N,N-di-isopropyl-N-(3-methyl-5-hexenyl)amine), poly (propylene-co-N,N-diethyl-N-(hexenyl)amine), or poly (propylene-co-N,N-diethyl-N-(heptenyl)amine).

In an embodiment a functionalized terpolymer is obtained, preferably a terpolymer in which the first monomer is selected from the group comprising ethylene and propylene, the second monomer is selected from the group comprising propylene, 1-hexene, 1-octene, norbornene or is ethylene when the first monomer is propylene or is propylene when the first monomer is ethylene and the third monomer is selected from the group comprising allyl chloride, allyl bromide, 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-dibromo-1-hexene, 6,6-diiodo-1-hexene, 5-bromo-5-methyl-1-hexene, 5-chloro-5-methyl-1-hexene, 7-bromo-1-heptene, 7-iodo-1-heptene, 6-bromo-1-heptene, 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-heptene, 7,8-diiodo-1-heptene, 11-bromo-1-undecene, 11-chloro-1-undecene, 11-iodo-1-undecene, 5-chloro-bicyclo(2.2.1)hept-2-ene, 5-bromo-bicyclo(2.2.1)hept-2-ene, 5-bromomethyl-bicyclo(2.2.1)hept-2-ene, 5-chloromethyl-bicyclo(2.2.1)hept-2-ene, 5-iodomethyl-bicyclo(2.2.1)hept-2-ene, 5-(2-bromoethyl)-bicyclo(2.2.1)hept-2-ene, 5-(2-chloroethyl)-bicyclo(2.2.1)hept-2-ene, 5-(3-bromopropyl)-bicyclo(2.2.1)hept-2-ene, 5-(3-bromopropyl)-bicyclo(2.2.1)hept-2-ene, N, N-diethyl-N-(butenyl)amine, N,N-di-n-propyl-N-(butenyl)amine, N,N-di-isopropyl-N-(butenyl)amine, N,N-diethyl-N-(pentenyl)amine, N,N-di-n-propyl-N-(pentenyl)amine, N,N-di-isopropyl-N-(pentenyl)amine, N,N-di-isopropyl-N-(3-methyl-5-hexenyl)amine, N,N-diethyl-N-(hexenyl)amine, N,N-di-isopropyl-N-(hexenyl)amine, N,N-di-n-propyl-N-(hexenyl)amine, N,N-diethyl-N-(heptenyl)amine, N,N-di-isopropyl-N-(heptenyl)amine, N,N-di-n-propyl-N-(heptenyl)amine, N,N-diethyl-N-(octenyl)amine, N,N-di-n-propyl-N-(octenyl)amine, N,N-di-isopropyl-N-(octenyl)amine, N,N-diethyl-N-(undecenyl)amine, N,N-di-n-propyl-N-(undecenyl)amine, N,N-di-isopropyl-N-(undecenyl)amine, 5-norbornene-2-N,N-diethylamine, 5-norbornene-2-N,N-(diethyl)methylamine, 5-norbornene-2-N,N-di(n-propyl)amine, 5-norbornene-2-N,N-(diisopropyl)methylamine, more preferably the functionalized terpolymer is poly(ethylene-co-1-octene-co-4-bromo-1-butene), poly(ethylene-co-1-octene-co-4-chloro-1-butene), poly(ethylene-co-1-octene-co-4-iodo-1-butene), poly(ethylene-co-1-octene-co-5-bromo-1-pentene), poly(ethylene-co-1-octene-co-5-chloro-1-pentene), poly(ethylene-co-1-octene-co-5-iodo-1-pentene), poly(ethylene-co-1-octene-co-5-bromo-1-hexene), poly(ethylene-co-1-octene-co-5-chloro-1-hexene), poly(ethylene-co-1-octene-co-5-iodo-1-hexene), poly(ethylene-co-1-octene-co-6-bromo-1-hexene), poly(ethylene-co-1-octene-co-6-chloro-1-hexene), poly(ethylene-co-1-octene-co-6-iodo-1-hexene), poly(ethylene-co-1-octene-co-7-bromo-1-heptene), poly(ethylene-co-1-octene-co-7-chloro-1-heptene), poly(ethylene-co-1-octene-co-7-iodo-1-heptene), poly(ethylene-co-1-octene-co-8-bromo-1-octene), poly(ethylene-co-1-octene-co-8-chloro-1-octene), poly(ethylene-co-1-octene-co-8-iodo-1-octene), poly(ethylene-co-1-octene-co-11-bromo-1-undecene), poly(ethylene-co-1-octene-co-11-chloro-1-undecene), poly(ethylene-co-1-octene-co-11-iodo-1-undecene), poly(ethylene-co-1-octene-co-N,N-diethyl-N-(butenyl)amine), poly(ethylene-co-1-octene-co-N,N-di-isopropyl-N-(butenyl)amine), poly(ethylene-co-1-octene-co-N,N-diethyl-N-(pentenyl)amine), poly(ethylene-co-1-octene-co-N,N-di-isopropyl-N-(pentenyl)amine), poly(ethylene-co-1-octene-co-11-N,N-di-isopropyl-N-(3-methyl-5-hexenyl)amine), poly(ethylene-co-1-octene-co-N,N-diethyl-N-(hexenyl)amine), poly(ethylene-co-1-octene-co-N,N-diethyl-N-(heptenyl)amine), poly(ethylene-co-1-hexene-co-4-bromo-1-butene), poly(ethylene-co-1-hexene-co-4-chloro-1-butene), poly(ethylene-co-1-hexene-co-4-iodo-1-butene), poly(ethylene-co-1-hexene-co-5-bromo-1-pentene), poly(ethylene-co-1-hexene-co-5-chloro-1-pentene), poly(ethylene-co-1-hexene-co-5-iodo-1-pentene), poly(ethylene-co-1-hexene-co-5-bromo-1-hexene), poly(ethylene-co-1-hexene-co-5-chloro-1-hexene), poly(ethylene-co-1-hexene-co-5-iodo-1-hexene), poly(ethylene-co-1-hexene-co-6-bromo-1-hexene), poly(ethylene-co-1-hexene-co-6-chloro-1-hexene), poly(ethylene-co-1-hexene-co-6-iodo-1-hexene), poly(ethylene-co-1-hexene-co-7-bromo-1-heptene), poly(ethylene-co-1-hexene-co-7-chloro-1-heptene), poly(ethylene-co-1-hexene-co-7-iodo-1-heptene), poly(ethylene-co-1-hexene-co-8-bromo-1-octene), poly(ethylene-co-1-hexene-co-8-chloro-1-octene), poly(ethylene-co-1-hexene-co-8-iodo-1-octene), poly(ethylene-co-1-hexene-co-11-bromo-1-undecene), poly(ethylene-co-1-hexene-co-11-chloro-1-undecene), poly(ethylene-co-1-hexene-co-11-iodo-1-undecene), poly(ethylene-co-1-hexene-co-N,N-diethyl-N-(butenyl)amine), poly(ethylene-co-1-hexene-co-N,N-di-isopropyl-N-(butenyl)amine), poly(ethylene-co-1-hexene-co-N,N-diethyl-N-(pentenyl)amine), poly(ethylene-co-1-hexene-co-N,N-di-isopropyl-N-(pentenyl)amine), poly(ethylene-co-1-hexene-co-11-N,N-di-isopropyl-N-(3-methyl-5-hexenyl)amine), poly(ethylene-co-1-hexene-co-N,N-diethyl-N-(hexenyl)amine), poly(ethylene-co-1-hexene-co-N,N-diethyl-N-(heptenyl)amine), poly(propylene-co-1-octene-co-4-bromo-1-butene), poly(propylene-co-1-octene-co-4-chloro-1-butene), poly(propylene-co-1-octene-co-4-iodo-1-butene), poly(propylene-co-1-octene-co-5-bromo-1-pentene), poly(propylene-co-1-octene-co-5-chloro-1-pentene), poly(propylene-co-1-octene-co-5-iodo-1-pentene), poly(propylene-co-1-octene-co-5-bromo-1-hexene), poly(propylene-co-1-octene-co-5-chloro-1-hexene), poly(propylene-co-1-octene-co-5-iodo-1-hexene), poly(propylene-co-1-octene-co-6-bromo-1-hexene), poly(propylene-co-1-octene-co-6-chloro-1-hexene), poly(propylene-co-1-octene-co-6-iodo-1-hexene), poly(propylene-co-1-octene-co-7-bromo-1-heptene), poly(propylene-co-1-octene-co-7-chloro-1-heptene), poly(propylene-co-1-octene-co-7-iodo-1-heptene), poly(propylene-co-1-octene-co-8-bromo-1-octene), poly(propylene-co-1-octene-co-8-chloro-1-octene), poly(propylene-co-1-octene-co-8-iodo-1-octene), poly(propylene-co-1-octene-co-11-bromo-1-undecene), poly(propylene-co-1-octene-co-11-chloro-1-undecene), poly(propylene-co-1-octene-co-11-iodo-1-undecene), poly(propylene-co-1-octene-co-N,N-diethyl-N-(butenyl)amine), poly(propylene-co-1-octene-co-N,N-di-isopropyl-N-(butenyl)amine), poly(propylene-co-1-octene-co-N,N-diethyl-N-(pentenyl)amine), poly(propylene-co-1-octene-co-N,N-di-isopropyl-N-(pentenyl)amine), poly(propylene-co-1-octene-co-11-N,N-di-isopropyl-N-(3-methyl-5-hexenyl)amine), poly(propylene-co-1-octene-co-N,N-diethyl-N-(hexenyl)amine), poly(propylene-co-1-octene-co-N,N-diethyl-N-(heptenyl)amine), poly(ethylene-co-norbornene-co-4-bromo-1-butene), poly(ethylene-co-norbornene-co-4-chloro-1-butene), poly(ethylene-co-norbornene-co-4-iodo-1-butene), poly(ethylene-co-norbornene-co-5-bromo-1-pentene), poly(ethylene-co-norbornene-co-5-chloro-1-pentene), poly(ethylene-co-norbornene-co-5-iodo-1-pentene), poly(ethylene-co-norbornene-co-5-bromo-1-hexene), poly(ethylene-co-norbornene-co-5-chloro-1-hexene), poly(ethylene-co-norbornene-co-5-iodo-1-hexene), poly(ethylene-co-norbornene-co-6-bromo-1-hexene), poly(ethylene-co-norbornene-co-6-chloro-1-hexene), poly(ethylene-co-norbornene-co-6-iodo-1-hexene), poly(ethylene-co-norbornene-co-7-bromo-1-heptene), poly(ethylene-co-norbornene-co-7-chloro-1-heptene), poly(ethylene-co-norbornene-co-7-iodo-1-heptene), poly(ethylene-co-norbornene-co-8-bromo-1-octene), poly(ethylene-co-norbornene-co-8-chloro-1-octene), poly(ethylene-co-norbornene-co-8-iodo-1-octene), poly(ethylene-co-norbornene-co-11-bromo-1-undecene), poly(ethylene-co-norbornene-co-11-chloro-1-undecene), poly(ethylene-co-norbornene-co-11-iodo-1-undecene), poly(ethylene-co-norbornene-co-N,N-diethyl-N-(butenyl)amine), poly(ethylene-co-norbornene-co-N,N-di-isopropyl-N-(butenyl)amine), poly(ethylene-co-norbornene-co-N,N-diethyl-N-(pentenyl)amine), poly(ethylene-co-norbornene-co-N,N-di-isopropyl-N-(pentenyl)amine), poly(ethylene-co-norbornene-co-11-N,N-di-isopropyl-N-(3-methyl-5-hexenyl)amine), poly(ethylene-co-norbornene-co-N,N-diethyl-N-(hexenyl)amine), poly(ethylene-co-norbornene-co-N,N-diethyl-N-(heptenyl)amine), poly(ethylene-co-propylene-co-4-bromo-1-butene), poly(ethylene-co-propylene-co-4-chloro-1-butene), poly(ethylene-co-propylene-co-4-iodo-1-butene), poly(ethylene-co-propylene-co-5-bromo-1-pentene), poly(ethylene-co-propylene-co-5-chloro-1-pentene), poly(ethylene-co-propylene-co-5-iodo-1-pentene), poly(ethylene-co-propylene-co-5-bromo-1-hexene), poly(ethylene-co-propylene-co-5-chloro-1-hexene), poly(ethylene-co-propylene-co-5-iodo-1-hexene), poly(ethylene-co-propylene-co-6-bromo-1-hexene), poly(ethylene-co-propylene-co-6-chloro-1-hexene), poly(ethylene-co-propylene-co-6-iodo-1-hexene), poly(ethylene-co-propylene-co-7-bromo-1-heptene), poly(ethylene-co-propylene-co-7-chloro-1-heptene), poly(ethylene-co-propylene-co-7-iodo-1-heptene), poly(ethylene-co-propylene-co-8-bromo-1-octene), poly(ethylene-co-propylene-co-8-chloro-1-octene), poly(ethylene-co-propylene-co-8-iodo-1-octene), poly(ethylene-co-propylene-co-11-bromo-1-undecene), poly(ethylene-co-propylene-co-11-chloro-1-undecene), poly(ethylene-co-propylene-co-11-iodo-1-undecene), poly(ethylene-co-propylene-co-N,N-diethyl-N-(butenyl)amine), poly(ethylene-co-propylene-co-N,N-di-isopropyl-N-(butenyl)amine), poly(ethylene-co-propylene-co-N,N-diethyl-N-(pentenyl)amine), poly(ethylene-co-propylene-co-N,N-di-isopropyl-N-(pentenyl)amine), poly(ethylene-co-propylene-co-11-N,N-di-isopropyl-N-(3-methyl-5-hexenyl)amine), poly(ethylene-co-propylene-co-N,N-diethyl-N-(hexenyl)amine), poly(ethylene-co-propylene-co-N,N-diethyl-N-(heptenyl)amine), poly(propylene-co-1-hexene-co-4-bromo-1-butene), poly(propylene-co-1-hexene-co-4-chloro-1-butene), poly(propylene-co-1-hexene-co-4-iodo-1-butene), poly(propylene-co-1-hexene-co-5-bromo-1-pentene), poly(propylene-co-1-hexene-co-5-chloro-1-pentene), poly(propylene-co-1-hexene-co-5-iodo-1-pentene), poly(propylene-co-1-hexene-co-5-bromo-1-hexene), poly(propylene-co-1-hexene-co-5-chloro-1-hexene), poly(propylene-co-1-hexene-co-5-iodo-1-hexene), poly(propylene-co-1-hexene-co-6-bromo-1-hexene), poly(propylene-co-1-hexene-co-6-chloro-1-hexene), poly(propylene-co-1-hexene-co-6-iodo-1-hexene), poly(propylene-co-1-hexene-co-7-bromo-1-heptene), poly(propylene-co-1-hexene-co-7-chloro-1-heptene), poly(propylene-co-1-hexene-co-7-iodo-1-heptene), poly(propylene-co-1-hexene-co-8-bromo-1-octene), poly(propylene-co-1-hexene-co-8-chloro-1-octene), poly(propylene-co-1-hexene-co-8-iodo-1-octene), poly(propylene-co-1-hexene-co-11-bromo-1-undecene), poly(propylene-co-1-hexene-co-11-chloro-1-undecene), poly(propylene-co-1-hexene-co-11-iodo-1-undecene), poly(propylene-co-1-hexene-co-N,N-diethyl-N-(butenyl)amine), poly(propylene-co-1-hexene-co-N,N-di-isopropyl-N-(butenyl)amine), poly(propylene-co-1-hexene-co-N,N-diethyl-N-(pentenyl)amine), poly(propylene-co-1-hexene-co-N,N-di-isopropyl-N-(pentenyl)amine), poly(propylene-co-1-hexene-co-11-N,N-di-isopropyl-N-(3-methyl-5-hexenyl)amine), poly(propylene-co-1-hexene-co-N,N-diethyl-N-(hexenyl)amine), poly(propylene-co-1-hexene-co-N,N-diethyl-N-(heptenyl)amine), poly(propylene-co-norbornene-co-4-bromo-1-butene), poly(propylene-co-norbornene-co-4-chloro-1-butene), poly(propylene-co-norbornene-co-4-iodo-1-butene), poly(propylene-co-norbornene-co-5-bromo-1-pentene), poly(propylene-co-norbornene-co-5-chloro-1-pentene), poly(propylene-co-norbornene-co-5-iodo-1-pentene), poly(propylene-co-norbornene-co-5-bromo-1-hexene), poly(propylene-co-norbornene-co-5-chloro-1-hexene), poly(propylene-co-norbornene-co-5-iodo-1-hexene), poly(propylene-co-norbornene-co-6-bromo-1-hexene), poly(propylene-co-norbornene-co-6-chloro-1-hexene), poly(propylene-co-norbornene-co-6-iodo-1-hexene), poly(propylene-co-norbornene-co-7-bromo-1-heptene), poly(propylene-co-norbornene-co-7-chloro-1-heptene), poly(propylene-co-norbornene-co-7-iodo-1-heptene), poly(propylene-co-norbornene-co-8-bromo-1-octene), poly(propylene-co-norbornene-co-8-chloro-1-octene), poly(propylene-co-norbornene-co-8-iodo-1-octene), poly(propylene-co-norbornene-co-11-bromo-1-undecene), poly(propylene-co-norbornene-co-11-chloro-1-undecene), poly(propylene-co-norbornene-co-11-iodo-1-undecene), poly(propylene-co-norbornene-co-N,N-diethyl-N-(butenyl)amine), poly(propylene-co-norbornene-co-N,N-di-isopropyl-N-(butenyl)amine), poly(propylene-co-norbornene-co-N,N-diethyl-N-(pentenyl)amine), poly(propylene-co-norbornene-co-N,N-di-isopropyl-N-(pentenyl)amine), poly(propylene-co-norbornene-co-11-N,N-di-isopropyl-N-(3-methyl-5-hexenyl)amine), poly(propylene-co-norbornene-co-N,N-diethyl-N-(hexenyl)amine), or poly(propylene-co-norbornene-co-N,N-diethyl-N-(heptenyl)amine).

A second aspect of the invention is the use of a functionalized polyolefin obtained by a process according to the invention in an article, as macroinitiator for graft copolymers via (controlled) radical polymerization, compatibilizer, filler dispersant, melting flow improver, adhesive, adhesion improver in coating or paint, shape memory film, self-healing film, antimicrobial or antiviral coating or film, or vehicle for controlled drug release or flavor release.

A third aspect of the invention is the use, in a solution process, of a catalyst system comprising a hafnium complex of a polyvalent aryloxyether and a co-catalyst selected from the group: MAO, DMAO, MMAO, SMAO and ammonium salts or trityl salts of fluorated tetraarylborates, in order to obtain a functionalized polyolefin.

Finally, a last aspect of the invention is a functionalized olefin obtainable by the process of the invention preferably:

Functionalized olefin copolymer having:
- $M_w$ range 40 to 300 kg/mol
- $M_n$ range of 20 to 150 kg/mol
- Crystallinity >30%
- Melting point between 100-155 °C.
- Randomly distributed halide or amine functionalities
- A functional comonomer content of 0.05-10 mol %, preferably 0.1-5 mol %, more preferably 0.02-2 mol %

Functionalized olefin terpolymer having:
- $M_w$ range 40 to 300 kg/mol
- $M_n$ range 20 to 150 kg/mol
- Crystallinity range 0-30%
- Melting point between 40-120 °C.
- A comonomer content of 0.5-20 mol %, preferably 2-18 mol %, more preferably 5-15 mol %
- Randomly distributed halide or amine functionalities A functional comonomer content of 0.05-10 mol %, preferably 0.1-5 mol %, more preferably 0.02-2 mol %

DETAILED DESCRIPTION

A copolymerization of at least one olefin monomer and at least one functionalized olefin monomer in the presence of the following components:

Olefin Monomer

The olefin monomer is selected from the group comprising: ethylene, propylene, 1-butene, 3-methyl-1-butene, 1-pentene, 4-methyl-1-pentene, 1-hexene, vinyl cyclohexane, 1-octene, 1-decene, norbornene, vinylidene-norbornene, ethylidene-norbornene, or a combination of thereof.

In another embodiment the at least one olefin monomer is propylene, in particular in an amount of at least 50 wt. %, preferably at least 60 wt. %, more preferably at least >70 wt. %, most preferably at least 80 wt. % with respect to the total weight of the olefin monomers and the functionalized olefin monomers.

In another embodiment the at least one olefin monomer is ethylene, in particular in an amount of at least 50 wt. %, preferably at least 60 wt. %, more preferably at least >70 wt. %, most preferably at least 80 wt. % with respect to the total weight of the olefin monomers and the functionalized olefin monomers.

The polymerization step may use one type of olefin monomer or two or more types of olefin monomer.

In another embodiment, the first and second olefin monomer are different and the amount of the first olefin monomer is from 20 to 80 mol % and the amount of second olefin monomer is from 80 to 20 mol %, based on the total molar amount of first and second olefin monomer.

In another embodiment, the first olefin is ethylene and the second olefin is 1-octene.

In another embodiment, the first olefin is ethylene and the second olefin is norbornene.

In another embodiment, the first olefin is propylene and the second olefin is 1-hexene.

In another embodiment, the first olefin is propylene and the second olefin is ethylene.

Functionalized Olefin Monomer

The functionalized olefin monomer has the following structure according to Formula (I):

(I)

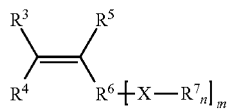

wherein $R^3$, $R^4$, and $R^5$ are each independently selected from the group consisting of H and hydrocarbyl with 1 to 16 carbon atoms, wherein $R^6$—$[X—(R^7)_n]_m$ is a polar functional group containing m heteroatom-containing functionalities $X—(R^7)_n$, in which m is an entire number between 1 and 10, preferably 1 or 2, wherein when n=0 (therefore there is no R), X is selected from F, Cl, Br, I or when n=2, X is N and each of the 2 $R^7$ are independently selected from the group of hydrocarbyls with 1 to 16 carbon atoms, wherein $R^6$ is either —$C(R^8)(R^9)$— or a plurality of —$C(R^8)(R^9)$— groups, wherein $R^8$, and $R^9$ are each independently selected from the group consisting of H or hydrocarbyl with 1 to 16 carbon atoms and $R^6$ comprises 1 to 10 carbon atoms, wherein X is attached to either the main chain and/or side chain of $R^6$, wherein $R^4$ and $R^6$ may together form a ring structure that is functionalized with one or multiple $X—(R^7)_n$, Preferably, X is selected from Br, I or N.

In a preferred embodiment, the functionalized olefin monomer according to Formula I is a halide-bearing α-olefin or halide-functionalized ring-strained cyclic olefin monomer.

Halide-bearing functionalized olefin monomers may correspond for example to Formula I wherein $R^3$, $R^4$, and $R^5$ are each H and wherein X is F, Cl, Br or I and wherein $R^6$ is either —$C(R^8)(R^9)$— or a plurality of —$C(R^8)(R^9)$— groups, wherein $R^8$ and $R^9$ are each independently selected from the group consisting of H or hydrocarbyl with 1 to 16 carbon atoms. Examples of $R^6$ groups are —$(CH_2)_9$— and —$(CH_2)_4$—.

Further examples of the halide-functionalized olefin monomer include, but are not limited to allyl chloride, allyl bromide, 4-chloro-1-butene, 4-bromo-1-butene, 4-iodo-1-butene, 3-bromo-3-methyl-1-butene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 6,6-dichloro-1-hexene, 6,6-dibromo-1-hexene, 5-bromo-5-methyl-1-hexene, 8-chloro-1-octene, 8-bromo-1-octene, 8-iodo-1-octene, 11-chloro-1-undecene, 11-bromo-1-undecene, 11-iodo-1-undecene.

Even further examples of halide functionalized olefin monomer include halide-functionalized ring-strained cyclic olefins (also called internal olefins), which may be for example typically halide-functionalized norbornenes, preferably 5-chloro-bicyclo(2.2.1)hept-2-ene, 5-chloromethyl-bicyclo(2.2.1)hept-2-ene, 5-bromo-bicyclo(2.2.1)hept-2-ene, 5-bromomethyl-bicyclo(2.2.1)hept-2-ene. They correspond to Formula I wherein $R^3$ and $R^5$ are H and $R^4$ and $R^6$ together for a ring structure that is functionalized with X, wherein X is F, Cl, Br or I.

Tertiary amine-bearing functionalized olefin monomers may for example correspond to Formula I wherein $R^3$, $R^4$, and $R^5$ are each H and wherein X is —N— and wherein $R^6$ is either —$C(R^8)(R^9)$— or a plurality of —$C(R^8)(R^9)$— groups, wherein $R^8$, and $R^9$ are each independently selected from the group consisting of H or hydrocarbyl with 1 to 16 carbon atoms. An example of an $R^6$ group is —$(CH_2)_6$—.

Further examples of the tertiary amine-functionalized olefin monomer include, but are not limited to N,N-diethyl-N-(butenyl)amine, N,N-di-n-propyl-N-(butenyl)amine, N,N-di-isopropyl-N-(butenyl)amine, N,N-diethyl-N-(hexenyl)amine, N,N-di-n-propyl-N-(hexenyl)amine, N,N-di-isopropyl-N-(hexenyl)amine, N,N-diethyl-N-(octenyl) amine, N,N-di-n-propyl-N-(octenyl)amine, N,N-di-isopropyl-N-(octenyl)amine, 5-norbornene-2-N,N-di(ethyl) amine, 5-norbornene-2-N,N-(diethyl)methylamine, 5-norbornene-2-N,N-di(n-propyl)amine, 5-norbornene-2-N,N-(diisopropyl)methylamine.

Olefins containing tertiary amine functions can be prepared and purified according to literature procedures described for example by Agapie et al., (Journal of the American Chemical Society (2013), 135(10), 3784-3787) and Marks et al., WO2019071102A1.

In an embodiment 2 different monomers are used in order to obtain a copolymer, preferably a copolymer in which the first monomer is selected from the group comprising ethylene and propylene and the second monomer is functionalized monomer selected from the group comprising allyl chloride, allyl bromide, 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-dibromo-1-hexene, 6,6-diiodo-1-hexene, 5-bromo-5-methyl-1-hexene, 5-chloro-5-methyl-1-hexene, 7-bromo-1-heptene, 7-iodo-1-heptene, 6-bromo-1-heptene, 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-heptene, 7,8-diiodo-1-heptene, 11-bromo-1-undecene, 11-chloro-1-undecene, 11-iodo-1-undecene, 5-chloro-bicyclo(2.2.1)hept-2-ene, 5-bromo-bicyclo(2.2.1)hept-2-ene, 5-bromomethyl-bicyclo(2.2.1)hept-2-ene, 5-chloromethyl-bicyclo(2.2.1)hept-2-ene, 5-iodomethyl-bicyclo(2.2.1)hept-2-ene, 5-(2-bromoethyl)-bicyclo(2.2.1)hept-2-ene, 5-(2-chloroethyl)-bicyclo(2.2.1)hept-2-ene, 5-(3-bromopropyl)-bicyclo(2.2.1)hept-2-ene, 5-(3-bromopropyl)-bicyclo(2.2.1)hept-2-ene, N,N-diethyl-N-(butenyl)amine, N,N-di-n-propyl-N-(butenyl)amine, N,N-di-isopropyl-N-(butenyl)amine, N,N-diethyl-N-(pentenyl)amine, N,N-di-n-propyl-N-(pentenyl)amine, N,N-di-isopropyl-N-(pentenyl)amine, N,N-di-isopropyl-N-(3-methyl-5-hexenyl)amine, N,N-diethyl-N-(hexenyl)amine, N,N-di-isopropyl-N-(hexenyl)amine, N,N-di-n-propyl-N-(hexenyl)amine, N,N-diethyl-N-(heptenyl)amine, N,N-di-isopropyl-N-(heptenyl)amine, N,N-di-n-propyl-N-(heptenyl)amine, N,N-diethyl-N-(octenyl)amine, N,N-di-n-propyl-N-(octenyl)amine, N,N-di-isopropyl-N-(octenyl)amine, N,N-diethyl-N-(undecenyl)amine, N,N-di-n-propyl-N-(undecenyl)amine, N,N-di-isopropyl-N-(undecenyl)amine, 5-norbornene-2-N,N-diethylamine, 5-norbornene-2-N,N-(diethyl)methylamine, 5-norbornene-2-N,N-di(n-propyl)amine, 5-norbornene-2-N,N-(diisopropyl)methylamine, more preferably the functionalized copolymer is poly(ethylene-co-4-bromo-1-butene), poly(ethylene-co-4-chloro-1-butene), poly(ethylene-co-4-iodo-1-butene), poly(ethylene-co-5-bromo-1-pentene), poly(ethylene-co-5-chloro-1-pentene), poly(ethylene-co-5-iodo-1-pentene), poly(ethylene-co-5-bromo-1-hexene), poly(ethylene-co-5-chloro-1-hexene), poly(ethylene-co-5-iodo-1-hexene), poly(ethylene-co-6-bromo-1-hexene), poly(ethylene-co-6-chloro-1-hexene), poly(ethylene-co-6-iodo-1-hexene), poly(ethylene-co-7-bromo-1-heptene), poly(ethylene-co-7-chloro-1-heptene), poly(ethylene-co-7-iodo-1-heptene), poly(ethylene-co-8-bromo-1-octene), poly(ethylene-co-8-chloro-1-octene), poly(ethylene-co-8-iodo-1-octene), poly(ethylene-co-11-bromo-1-undecene), poly(ethylene-co-11-chloro-1-undecene), poly(ethylene-co-11-iodo-1-undecene), poly(ethylene-co-N,N-diethyl-N-(butenyl)amine), poly(ethylene-co-N,N-di-isopropyl-N-(butenyl)amine), poly(ethylene-co-N,N-diethyl-N-(pentenyl)amine), poly(ethylene-co-N,N-di-isopropyl-N-(pentenyl)amine), poly(ethylene-co-11-N,N-di-isopropyl-N-(3-methyl-5-hexenyl)amine), poly(ethylene-co-N,N-diethyl-N-(hexenyl)amine), poly(ethylene-co-N,N-diethyl-N-(heptenyl)amine), poly(propylene-co-4-bromo-1-butene), poly(propylene-co-4-chloro-1-butene), poly(propylene-co-4-iodo-1-butene), poly(propylene-co-5-bromo-1-pentene), poly(propylene-co-5-chloro-1-pentene), poly(propylene-co-5-iodo-1-pentene), poly(propylene-co-5-bromo-1-hexene), poly(propylene-co-5-chloro-1-hexene), poly(propylene-co-5-iodo-1-hexene), poly(propylene-co-6-bromo-1-hexene), poly(propylene-co-6-chloro-1-hexene), poly(propylene-co-6-iodo-1-hexene), poly(propylene-co-7-bromo-1-heptene), poly(propylene-co-7-chloro-1-heptene), poly(propylene-co-7-iodo-1-heptene), poly(propylene-co-8-bromo-1-octene), poly(propylene-co-8-chloro-1-octene), poly(propylene-co-8-iodo-1-octene), poly(propylene-co-11-bromo-1-undecene), poly(propylene-co-11-chloro-1-undecene), poly(propylene-co-11-iodo-1-undecene), poly(propylene-co-N,N-diethyl-N-(butenyl)amine), poly(propylene-co-N,N-di-isopropyl-N-(butenyl)amine), poly(propylene-co-N,N-diethyl-N-(pentenyl)amine), poly(propylene-co-N,N-di-isopropyl-N-(pentenyl)amine), poly(propylene-co-11-N,N-di-isopropyl-N-(3-methyl-5-hexenyl)amine), poly(propylene-co-N,N-diethyl-N-(hexenyl)amine), or poly(propylene-co-N,N-diethyl-N-(heptenyl)amine).

In another embodiment 3 different monomers are used in order to obtain a terpolymer, preferably a terpolymer in which the first monomer is selected from the group comprising ethylene and propylene, the second monomer is selected from the group comprising propylene, 1-hexene, 1-octene, norbornene or is ethylene when the first monomer is propylene or is propylene when the first monomer is ethylene and the third monomer is selected from the group comprising allyl chloride, allyl bromide, 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-dibromo-1-hexene, 6,6-diiodo-1-hexene, 5-bromo-5-methyl-1-hexene, 5-chloro-5-methyl-1-hexene, 7-bromo-1-heptene, 7-iodo-1-heptene, 6-bromo-1-heptene, 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-heptene, 7,8-diiodo-1-heptene, 11-bromo-1-undecene, 11-chloro-1-undecene, 11-iodo-1-undecene, 5-chloro-bicyclo(2.2.1)hept-2-ene, 5-bromo-bicyclo(2.2.1)hept-2-ene, 5-bromomethyl-bicyclo(2.2.1)hept-2-ene, 5-chloromethyl-bicyclo(2.2.1)hept-2-ene, 5-iodomethyl-bicyclo(2.2.1)hept-2-ene, 5-(2-bromoethyl)-bicyclo(2.2.1)hept-2-ene, 5-(2-chloroethyl)-bicyclo(2.2.1)hept-2-ene, 5-(3-bromopropyl)-bicyclo(2.2.1)hept-2-ene, 5-(3-bromopropyl)-bicyclo(2.2.1)hept-2-ene, N,N-diethyl-N-(butenyl)amine, N,N-di-n-propyl-N-(butenyl)amine, N,N-di-isopropyl-N-(butenyl)amine, N,N-diethyl-N-(pentenyl)amine, N,N-di-n-propyl-N-(pentenyl)amine, N,N-di-isopropyl-N-(pentenyl)amine, N,N-di-isopropyl-N-(3-methyl-5-hexenyl)amine, N,N-diethyl-N-(hexenyl)amine, N,N-di-isopropyl-N-(hexenyl)amine, N,N-di-n-propyl-N-(hexenyl)amine, N,N-diethyl-N-(heptenyl)amine, N,N-di-isopropyl-N-(heptenyl)amine, N,N-di-n-propyl-N-(heptenyl)amine, N,N-diethyl-N-(octenyl)amine, N,N-di-n-propyl-N-(octenyl)amine, N,N-di-isopropyl-N-(octenyl)amine, N,N-diethyl-N-(undecenyl)amine, N,N-di-n-propyl-N-(undecenyl)amine, N,N-di-isopropyl-N-(undecenyl)amine, 5-norbornene-2-N,N-diethylamine, 5-norbornene-2-N,N-(diethyl)methylamine, 5-norbornene-2-N,N-di(n-propyl)amine, 5-norbornene-2-N,N-(diisopropyl)methylamine, more preferably the functionalized terpolymer is poly(ethylene-co-1-octene-co-4-bromo-1-butene), poly (ethylene-co-1-octene-co-4-chloro-1-butene), poly(ethylene-co-1-octene-co-4-iodo-1-butene), poly(ethylene-co-1-octene-co-5-bromo-1-pentene), poly(ethylene-co-1-octene-co-5-chloro-1-pentene), poly(ethylene-co-1-octene-co-5-iodo-1-pentene), poly(ethylene-co-1-octene-co-5-bromo-1-hexene), poly(ethylene-co-1-octene-co-5-chloro-1-hexene), poly(ethylene-co-1-octene-co-5-iodo-1-hexene), poly(ethylene-co-1-octene-co-6-bromo-1-hexene), poly(ethylene-co-1-octene-co-6-chloro-1-hexene), poly(ethylene-co-1-octene-co-6-iodo-1-hexene), poly(ethylene-co-1-octene-co-7-bromo-1-heptene), poly(ethylene-co-1-octene-co-7-chloro-1-heptene), poly(ethylene-co-1-octene-co-7-iodo-1-heptene), poly(ethylene-co-1-octene-co-8-bromo-1-octene), poly(ethylene-co-1-octene-co-8-chloro-1-octene), poly(ethylene-co-1-octene-co-8-iodo-1-octene), poly(ethylene-co-1-octene-co-11-bromo-1-undecene), poly(ethylene-co-1-octene-co-11-chloro-1-undecene), poly(ethylene-co-1-octene-co-11-iodo-1-undecene), poly(ethylene-co-1-octene-co-N,N-diethyl-N-(butenyl)amine), poly(ethylene-co-1-octene\-co-N,N-di-isopropyl-N-(butenyl)amine), poly (ethylene-co-1-octene-co-N,N-diethyl-N-(pentenyl)amine), poly(ethylene-co-1-octene-co-N,N-di-isopropyl-N-(pentenyl)amine), poly(ethylene-co-1-octene-co-11-N,N-di-isopropyl-N-(3-methyl-5-hexenyl)amine), poly(ethylene-co-1-octene-co-N,N-diethyl-N-(hexenyl)amine), poly(ethylene-co-1-octene-co-N,N-diethyl-N-(heptenyl)amine), poly (ethylene-co-1-hexene-co-4-bromo-1-butene), poly (ethylene-co-1-hexene-co-4-chloro-1-butene), poly (ethylene-co-1-hexene-co-4-iodo-1-butene), poly(ethylene-co-1-hexene-co-5-bromo-1-pentene), poly(ethylene-co-1-hexene-co-5-chloro-1-pentene), poly(ethylene-co-1-hexene-co-5-iodo-1-pentene), poly(ethylene-co-1-hexene-co-5-bromo-1-hexene), poly(ethylene-co-1-hexene-co-5-chloro-1-hexene), poly(ethylene-co-1-hexene-co-5-iodo-1-hexene), poly(ethylene-co-1-hexene-co-6-bromo-1-hexene), poly(ethylene-co-1-hexene-co-6-chloro-1-hexene), poly(ethylene-co-1-hexene-co-6-iodo-1-hexene), poly(ethylene-co-1-hexene-co-7-bromo-1-heptene), poly(ethylene-co-1-hexene-co-7-chloro-1-heptene), poly(ethylene-co-1-hexene-co-7-iodo-1-heptene), poly(ethylene-co-1-hexene-co-8-bromo-1-octene), poly(ethylene-co-1-hexene-co-8-chloro-1-octene), poly(ethylene-co-1-hexene-co-8-iodo-1-octene), poly(ethylene-co-1-hexene-co-11-bromo-1-undecene), poly(ethylene-co-1-hexene-co-11-chloro-1-undecene), poly(ethylene-co-1-hexene-co-11-iodo-1-undecene), poly(ethylene-co-1-hexene-co-N,N-diethyl-N-(butenyl)amine), poly(ethylene-co-1-hexene-co-N,N-di-isopropyl-N-(butenyl)amine), poly(ethylene-co-1-hexene-co-N,N-diethyl-N-(pentenyl)amine), poly(ethylene-co-1-hexene-co-N,N-di-isopropyl-N-(pentenyl)amine), poly (ethylene-co-1-hexene-co-11-N,N-di-isopropyl-N-(3-methyl-5-hexenyl)amine), poly(ethylene-co-1-hexene-co-N,N-diethyl-N-(hexenyl)amine), poly(ethylene-co-1-hexene-co-N,N-diethyl-N-(heptenyl)amine), poly (propylene-co-1-octene-co-4-bromo-1-butene), poly (propylene-co-1-octene-co-4-chloro-1-butene), poly (propylene-co-1-octene-co-4-iodo-1-butene), poly (propylene-co-1-octene-co-5-bromo-1-pentene), poly (propylene-co-1-octene-co-5-chloro-1-pentene), poly (propylene-co-1-octene-co-5-iodo-1-pentene), poly (propylene-co-1-octene-co-5-bromo-1-hexene), poly (propylene-co-1-octene-co-5-chloro-1-hexene), poly (propylene-co-1-octene-co-5-iodo-1-hexene), poly (propylene-co-1-octene-co-6-bromo-1-hexene), poly (propylene-co-1-octene-co-6-chloro-1-hexene), poly (propylene-co-1-octene-co-6-iodo-1-hexene), poly (propylene-co-1-octene-co-7-bromo-1-heptene), poly (propylene-co-1-octene-co-7-chloro-1-heptene), poly (propylene-co-1-octene-co-7-iodo-1-heptene), poly (propylene-co-1-octene-co-8-bromo-1-octene), poly (propylene-co-1-octene-co-8-chloro-1-octene), poly (propylene-co-1-octene-co-8-iodo-1-octene), poly (propylene-co-1-octene-co-11-bromo-1-undecene), poly (propylene-co-1-octene-co-11-chloro-1-undecene), poly (propylene-co-1-octene-co-11-iodo-1-undecene), poly (propylene-co-1-octene-co-N,N-diethyl-N-(butenyl)amine), poly(propylene-co-1-octene-co-N,N-di-isopropyl-N-(butenyl)amine), poly(propylene-co-1-octene-co-N,N-diethyl-N-(pentenyl)amine), poly(propylene-co-1-octene-co-N,N-di-isopropyl-N-(pentenyl)amine), poly(propylene-co-1-octene-co-11-N,N-di-isopropyl-N-(3-methyl-5-hexenyl)amine), poly(propylene-co-1-octene-co-N,N-diethyl-N-(hexenyl) amine), poly(propylene-co-1-octene-co-N,N-diethyl-N-(heptenyl)amine), poly(ethylene-co-norbornene-co-4-bromo-1-butene), poly(ethylene-co-norbornene-co-4-chloro-1-butene), poly(ethylene-co-norbornene-co-4-iodo-1-butene), poly(ethylene-co-norbornene-co-5-bromo-1-pentene), poly(ethylene-co-norbornene-co-5-chloro-1-pentene), poly(ethylene-co-norbornene-co-5-iodo-1-pentene), poly(ethylene-co-norbornene-co-5-bromo-1-hexene), poly(ethylene-co-norbornene-co-5-chloro-1-hexene), poly(ethylene-co-norbornene-co-5-iodo-1-hexene), poly(ethylene-co-norbornene-co-6-bromo-1-hexene), poly(ethylene-co-norbornene-co-6-chloro-1-hexene), poly(ethylene-co-norbornene-co-6-iodo-1-hexene), poly(ethylene-co-norbornene-co-7-bromo-1-heptene), poly(ethylene-co-norbornene-co-7-chloro-1-heptene), poly(ethylene-co-norbornene-co-7-iodo-1-heptene), poly(ethylene-co-norbornene-co-8-bromo-1-octene), poly(ethylene-co-norbornene-co-8-chloro-1-octene), poly(ethylene-co-norbornene-co-8-iodo-1-octene), poly(ethylene-co-norbornene-co-11-bromo-1-undecene), poly(ethylene-co-norbornene-co-11-chloro-1-undecene), poly(ethylene-co-norbornene-co-11-iodo-1-undecene), poly (ethylene-co-norbornene-co-N,N-diethyl-N-(butenyl) amine), poly(ethylene-co-norbornene-co-N,N-di-isopropyl-N-(butenyl)amine), poly(ethylene-co-norbornene-co-N,N-diethyl-N-(pentenyl)amine), poly(ethylene-co-norbornene-co-N,N-di-isopropyl-N-(pentenyl)amine), poly(ethylene-co-norbornene-co-11-N,N-di-isopropyl-N-(3-methyl-5-hexenyl)amine), poly(ethylene-co-norbornene-co-N,N-diethyl-N-(hexenyl)amine), poly(ethylene-co-norbornene-co-N,N-diethyl-N-(heptenyl)amine), poly(ethylene-co-propylene-co-4-bromo-1-butene), poly(ethylene-co-propylene-co-4-chloro-1-butene), poly(ethylene-co-propylene-co-4-iodo-1-butene), poly(ethylene-co-propylene-co-5-bromo-1-pentene), poly(ethylene-co-propylene-co-5-chloro-1-pentene), poly(ethylene-co-propylene-co-5-iodo-1-pentene), poly(ethylene-co-propylene-co-5-bromo-1-hexene), poly(ethylene-co-propylene-co-5-chloro-1-hexene), poly(ethylene-co-propylene-co-5-iodo-1-hexene), poly(ethylene-co-propylene-co-6-bromo-1-hexene), poly(ethylene-co-propylene-co-6-chloro-1-hexene), poly(ethylene-co-propylene-co-6-iodo-1-hexene), poly(ethylene-co-propylene-co-7-bromo-1-heptene), poly(ethylene-co-propylene-co-7-chloro-1-heptene), poly(ethylene-co-propylene-co-7-iodo-1-heptene), poly(ethylene-co-propylene-co-8-bromo-1-octene), poly(ethylene-co-propylene-co-8-chloro-1-octene), poly(ethylene-co-propylene-co-8-iodo-1-octene), poly(ethylene-co-propylene-co-11-bromo-1-undecene), poly(ethylene-co-propylene-co-11-chloro-1-undecene), poly(ethylene-co-propylene-co-11-iodo-1-undecene), poly(ethylene-co-propylene-co-N,N-diethyl-N-(butenyl)amine), poly(ethylene-co-propylene-co-N,N-di-isopropyl-N-(butenyl)amine), poly(ethylene-co-propylene-co-N,N-diethyl-N-(pentenyl)amine), poly(ethylene-co-propylene-co-N,N-di-isopropyl-N-(pentenyl)amine), poly(ethylene-co-propylene-co-11-N,N-di-isopropyl-N-(3-methyl-5-hexenyl)amine), poly(ethylene-co-propylene-co-N,N-diethyl-N-(hexenyl)amine), poly(ethylene-co-propylene-co-N,N-diethyl-N-(heptenyl)amine), poly(propylene-co-1-hexene-co-4-bromo-1-butene), poly(propylene-co-1-hexene-co-4-chloro-1-butene), poly(propylene-co-1-hexene-co-4-iodo-1-butene), poly(propylene-co-1-hexene-co-5-bromo-1-pentene), poly(propylene-co-1-hexene-co-5-chloro-1-pentene), poly(propylene-co-1-hexene-co-5-iodo-1-pentene), poly(propylene-co-1-hexene-co-5-bromo-1-hexene), poly(propylene-co-1-hexene-co-5-chloro-1-hexene), poly(propylene-co-1-hexene-co-5-iodo-1-hexene), poly(propylene-co-1-hexene-co-6-bromo-1-hexene), poly(propylene-co-1-hexene-co-6-chloro-1-hexene), poly(propylene-co-1-hexene-co-6-iodo-1-hexene), poly(propylene-co-1-hexene-co-7-bromo-1-heptene), poly(propylene-co-1-hexene-co-7-chloro-1-heptene), poly(propylene-co-1-hexene-co-7-iodo-1-heptene), poly(propylene-co-1-hexene-co-8-bromo-1-octene), poly(propylene-co-1-hexene-co-8-chloro-1-octene), poly(propylene-co-1-hexene-co-8-iodo-1-octene), poly(propylene-co-1-hexene-co-11-bromo-1-undecene), poly(propylene-co-1-hexene-co-11-chloro-1-undecene), poly(propylene-co-1-hexene-co-11-iodo-1-undecene), poly(propylene-co-1-hexene-co-N,N-diethyl-N-(butenyl)amine), poly(propylene-co-1-hexene-co-N,N-di-isopropyl-N-(butenyl)amine), poly(propylene-co-1-hexene-co-N,N-diethyl-N-(pentenyl)amine), poly(propylene-co-1-hexene-co-N,N-di-isopropyl-N-(pentenyl)amine), poly(propylene-co-1-hexene-co-11-N,N-di-isopropyl-N-(3-methyl-5-hexenyl)amine), poly(propylene-co-1-hexene-co-N,N-diethyl-N-(hexenyl)amine), poly(propylene-co-1-hexene-co-N,N-diethyl-N-(heptenyl)amine), poly(propylene-co-norbornene-co-4-bromo-1-butene), poly(propylene-co-norbornene-co-4-chloro-1-butene), poly(propylene-co-norbornene-co-4-iodo-1-butene), poly(propylene-co-norbornene-co-5-bromo-1-pentene), poly(propylene-co-norbornene-co-5-chloro-1-pentene), poly(propylene-co-norbornene-co-5-iodo-1-pentene), poly(propylene-co-norbornene-co-5-bromo-1-hexene), poly(propylene-co-norbornene-co-5-chloro-1-hexene), poly(propylene-co-norbornene-co-5-iodo-1-hexene), poly(propylene-co-norbornene-co-6-bromo-1-hexene), poly(propylene-co-norbornene-co-6-chloro-1-hexene), poly(propylene-co-norbornene-co-6-iodo-1-hexene), poly(propylene-co-norbornene-co-7-bromo-1-heptene), poly(propylene-co-norbornene-co-7-chloro-1-heptene), poly(propylene-co-norbornene-co-7-iodo-1-heptene), poly(propylene-co-norbornene-co-8-bromo-1-octene), poly(propylene-co-norbornene-co-8-chloro-1-octene), poly(propylene-co-norbornene-co-8-iodo-1-octene), poly(propylene-co-norbornene-co-11-bromo-1-undecene), poly(propylene-co-norbornene-co-11-chloro-1-undecene), poly(propylene-co-norbornene-co-11-iodo-1-undecene), poly(propylene-co-norbornene-co-N,N-diethyl-N-(butenyl)amine), poly(propylene-co-norbornene-co-N,N-di-isopropyl-N-(butenyl)amine), poly(propylene-co-norbornene-co-N,N-diethyl-N-(pentenyl)amine), poly(propylene-co-norbornene-co-N,N-di-isopropyl-N-(pentenyl)amine), poly(propylene-co-norbornene-co-11-N,N-di-isopropyl-N-(3-methyl-5-hexenyl)amine), poly(propylene-co-norbornene-co-N,N-diethyl-N-(hexenyl)amine), or poly(propylene-co-norbornene-co-N,N-diethyl-N-(heptenyl)amine).

It is preferred that the amount of the functionalized olefin monomers in the functionalized polyolefin is from 0.01 to 20 mol %, preferably from 0.02 to 15 mol % or from 0.05 to 10 mol %, or from 0.1 to 5 mol %, more preferably 0.02 to 2 mol %, with respect to the total molar amount of the olefin monomers and the functionalized olefin monomers in the functionalized polyolefin.

Catalyst System Suitable for the Process According to the Invention.

The process according to the invention is performed in the presence of a suitable catalyst system which comprise at least A catalyst A co-catalyst Optionally a scavenger Optionally a chain transfer Catalyst The catalyst is a ligand-metal complexes having a bridged bis-bi-aryl structure. In particular, the ligands are dianionic chelating ligands that can occupy up to four coordination sites of a metal precursor atom and more specifically have a bridged-bis-bi-aryl structure.

The metal-ligand complexes used in this invention can be characterized by the general formula: (4,O)MLn' (VI) where (4,O) is a dianionic ligand having at least 4 atoms that are oxygen and chelating to the metal M at 4 coordination sites through oxygen atoms with two of the bonds between the oxygen and the metal being covalent in nature and two of the bonds being dative in nature; M is a metal selected from the group consisting of group 4 of the Periodic Table of Elements, more specifically, from Hf or Zr, preferentially Hf; L is independently selected from the group consisting of halide (F, Cl, Br, I), optionally substituted alkyl, alkenyl, alkynyl, heteroalkyl, heteroalkenyl, heteroalkynyl, aryl, heteroaryl, alkoxyl, aryloxyl, silyl, boryl, phosphino, amino, alkylthio, arylthio, nitro, hydrido, borohydride, allyl, diene, phosphine, carboxylates, 1,3-dionates, oxalates, carbonates, nitrates, sulphates, ethers, thioethers and combinations thereof; and optionally two or more L groups may be linked together in a ring structure; n' is 1, 2, 3, or 4.

The metal precursors may be monomeric, dimeric or higher orders thereof. Specific examples of suitable hafnium and zirconium precursors include, but are not limited to $HfCl_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, and $Zr(N(SiMe_3)_2)_2Cl_2$.

Lewis base adducts of these examples are also suitable as metal precursors, for example, ethers, amines, thioethers, phosphines and the like are suitable as Lewis bases.

In still other embodiments, the metal-ligand complexes of this invention may be characterized by the general formula:

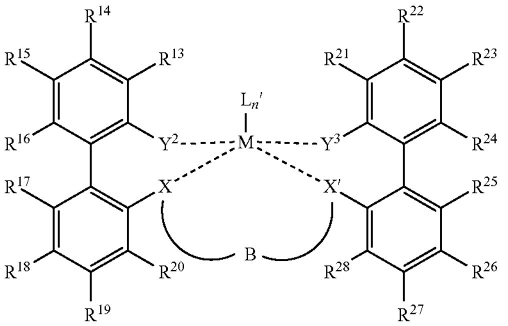

Wherein

R13, R14, R15, R16, R17, R18, R19, R20, R21, R22, R23, R24, R25, R26, R27 and R28 are independently selected from the group consisting of hydride, halide, and optionally substituted hydrocarbyl, heteroatom-containing hydrocarbyl, alkoxy, aryloxy, silyl, boryl, phosphino, amino, alkylthio, arylthio, thioxy, seleno, nitro, and combinations thereof; optionally two or more R groups can combine together into ring structures, with such ring structures having from 3 to 100 atoms in the ring not counting hydrogen atoms M is a metal Hf or Zr, L is a moiety that forms a covalent, dative or ionic bond with M; and n' is 1, 2, 3 or 4.

X, X', $Y^2$ and $Y^3$ are oxygen atoms,

B is a bridging group having from one to 50 atoms not counting hydrogen atoms, preferentially B is a propane bridge In a preferred embodiment ligand-metal complex must be a hafnium or zirconium complex of a polyvalent aryloxyether, selected from the group comprising at least: bis((2-oxoyl-3-(1,2,3,4,6,7,8,9-octahydroanthracen-5-yl)-5-(methyl)phenyl)-2-phenoxy)-1,3-propanediylhafnium (IV) dimethyl, bis((2-oxoyl-3-(1,2,3,4,6,7,8,9-octahydroanthracen-5-yl)-5-(methyl)phenyl)-2-phenoxy)-1,3-propanediylhafnium (IV) dichloride, bis((2-oxoyl-3-(1,2,3,4,6,7,8,9-octahydroanthracen-5-yl)-5-(methyl)phenyl)-2-phenoxy)-1,3-propanediylhafnium (IV) dibenzyl, bis((2-oxoyl-3-(dibenzo-1H-pyrrole-1-yl)-5-(methyl)phenyl)-2-phenoxy)-1,3-propanediylhafnium (IV) dimethyl, bis((2-oxoyl-3-(dibenzo-1H-pyrrole-1-yl)-5-(methyl)phenyl)-2-phenoxy)-1,3-propanediylhafnium (IV) dichloride, bis((2-oxoyl-3-(dibenzo-1H-pyrrole-1-yl)-5-(methyl)phenyl)-2-phenoxy)-1,3-propanediylhafnium (IV) dibenzyl, bis((2-oxoyl-3-(1,2,3,4,6,7,8,9-octahydroanthracen-5-yl)-5-(methyl)phenyl)-2-phenoxymethyl)-1,4-butanediylhafnium (IV) dimethyl, bis((2-oxoyl-3-(1,2,3,4,6,7,8,9-octahydroanthracen-5-yl)-5-(methyl)phenyl)-2-phenoxymethyl)-1,4-butanediylhafnium (IV) dichloride, bis((2-oxoyl-3-(1,2,3,4,6,7,8,9-octahydroanthracen-5-yl)-5-(methyl)phenyl)-2-phenoxymethyl)-1,4-butanediylhafnium (IV) dibenzyl, bis((2-oxoyl-3-(dibenzo-1H-pyrrole-1-yl)-5-(methyl)phenyl)-2-phenoxymethyl)-1,4-butanediylhafnium (IV)dimethyl, bis((2-oxoyl-3-(dibenzo-1H-pyrrole-1-yl)-5-(methyl)phenyl)-2-phenoxymethyl)-1,4-butanediylhafnium (IV) dichloride, bis((2-oxoyl-3-(dibenzo-1H-pyrrole-1-yl)-5-(methyl)phenyl)-2-phenoxymethyl)-1,4-butanediylhafnium (IV) dibenzyl, bis((2-oxoyl-3-(1,2,3,4,6,7,8,9-octahydroanthracen-5-yl)-5-(methyl)phenyl)-2-phenoxy)-2,4-pentanediylhafnium (IV) dimethyl, bis((2-oxoyl-3-(1,2,3,4,6,7,8,9-octahydroanthracen-5-yl)-5-(methyl)phenyl)-2-phenoxy)-2,4-pentanediylhafnium (IV) dichloride, bis((2-oxoyl-3-(1,2,3,4,6,7,8,9-octahydroanthracen-5-yl)-5-(methyl)phenyl)-2-phenoxy)-2,4-pentanediylhafnium (IV) dibenzyl, bis((2-oxoyl-3-(dibenzo-1H-pyrrole-1-yl)-5-(methyl)phenyl)-2-phenoxy)-2,4-pentanediylhafnium (IV) dimethyl, bis((2-oxoyl-3-(dibenzo-1H-pyrrole-1-yl)-5-(methyl)phenyl)-2-phenoxy)-2,4-pentanediylhafnium (IV) dichloride, bis((2-oxoyl-3-(dibenzo-1H-pyrrole-1-yl)-5-(methyl)phenyl)-2-phenoxy)-2,4-pentanediylhafnium (IV) dibenzyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dimethyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dichloride, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dibenzyl, bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl, bis((2-oxoyl-3-(dibenzo-1H-pyrrole-1-yl)-5-(methyl)phenyl)-2-phenoxymethyl)-methylenetrans-1,2-cyclohexanediylhafnium (IV) dichloride, and bis((2-oxoyl-3-(dibenzo-1H-pyrrole-1-yl)-5-(methyl)phenyl)-2-phenoxymethyl)-methylenetrans-1,2-cyclohexanediylhafnium (IV) dibenzyl, bis((2-oxoyl-3-(dibenzo-1H-pyrrole-1-yl)phenyl)-2-phenoxy)-1,3-propylhafnium (IV) dibenzyl, bis((2-oxoyl-3-(dibenzo-1H-pyrrole-1-yl)phenyl)-2-phenoxy)-1,4-n-butylhafnium (IV) dimethyl, bis((2-oxoyl-3-(dibenzo-1H-pyrrole-1-yl)phenyl)-2-phenoxy)-1,4-n-butylhafnium (IV) dibenzyl, bis((2-oxoyl-3-(3,6-bis(1,1-dimethylethyl)-9H-carbazolyl)phenyl)-2-phenoxy)-1,3-propylhafnium (IV) dimethyl, bis((2-oxoyl-3-(3,6-bis(1,1-dimethylethyl)-9H-carbazolyl)phenyl)-2-phenoxy)-1,3-propylhafnium (IV) dibenzyl, bis((2-oxoyl-3-(3,6-bis(1,1-dimethylethyl)-9H-carbazolyl)phenyl)-2-phenoxy)-1,4-n-butylhafnium (IV) dimethyl, bis((2-oxoyl-3-(3,6-bis(1,1-dimethylethyl)-9H-carbazolyl)phenyl)-2-phenoxy)-1,4-n-butylhafnium (IV) dibenzyl, bis((2-oxoyl-3-(4-methoxy-3,5-bis(1,1-dimethylethyl)phenyl)phenyl)-2-phenoxy)-1,4-n-butylhafnium (IV) dimethyl, bis((2-oxoyl-3-(4-methoxy-3,5-bis(1,1-dimethylethyl)phenyl)phenyl)-2-phenoxy)-1,4-n-butylhafnium (IV) dibenzyl, bis((2-oxoyl-3-(dibenzo-1H-pyrrole-1-yl)phenyl)-2-phenoxy)-1,2-ethylhafnium (IV) dimethyl, bis((2-oxoyl-3-(dibenzo-1H-pyrrole-1-yl)phenyl)-2-phenoxy)-1,2-ethylhafnium (IV) dibenzyl, bis((2-oxoyl-3-(dibenzo-1H-pyrrole-1-yl)phenyl)-2-phenoxy)-1,3-propylhafnium (IV) dimethyl; preferably bis((2-oxoyl-3-(dibenzo-1H-pyrrole-1-yl)-5-(methyl)phenyl)-2-phenoxy)-2,4-pentanediylhafnium (IV) dimethyl, bis((2-oxoyl-3-(dibenzo-1H-pyrrole-1-yl)-5-(methyl)phenyl)-2-phenoxy)-2,4-pentanediylhafnium (IV) dichloride; bis((2-oxoyl-3-(dibenzo-1H-pyrrole-1-yl)-5-(methyl)phenyl)-2-phenoxy)-2,4-pentanediylzirconium (IV) dimethyl, bis((2-oxoyl-3-(dibenzo-1H-pyrrole-1-yl)-5-(methyl)phenyl)-2-phenoxy)-2,4-pentanediylzirconium (IV) dichloride, bis((2-oxoyl-3-(1,2,3,4,6,7,8,9-octahydroanthracen-5-yl)-5-(methyl)phenyl)-2-phenoxy)-1,3-propanediylzirconium (IV) dimethyl, bis((2-oxoyl-3-(1,2,3,4,6,7,8,9-octahydroanthracen-5-yl)-5-(methyl)phenyl)-2-phenoxy)-1,3-propanediylzirconium (IV) dichloride, bis((2-oxoyl-3-(1,2,3,4,6,7,8,9-octahydroanthracen-5-yl)-5-(methyl)phenyl)-2-phenoxy)-1,3-propanediylzirconium (IV) dibenzyl, bis((2-oxoyl-3-(dibenzo-1H-pyrrole-1-yl)-5-(methyl)phenyl)-2-phenoxy)-1,3-propanediylzirconium (IV) dimethyl, bis((2-oxoyl-3-(dibenzo-1H-pyrrole-1-yl)-5-(methyl)phenyl)-2-phenoxy)-1,3-propanediylzirconium (IV) dichloride, bis((2-oxoyl-3-(dibenzo-1H-pyrrole-1-yl)-5-(methyl)phenyl)-2-phenoxy)-1,3-propanediylzirconium (IV) dibenzyl, bis((2-oxoyl-3-(1,2,3,4,6,7,8,9-octahydroanthracen-5-yl)-5-(methyl)phenyl)-2-phenoxymethyl)-1,4-butanediylzirconium (IV) dimethyl, bis((2-oxoyl-3-(1,2,3,4,6,7,8,9-octahydroanthracen-5-yl)-5-(methyl)phenyl)-2-phenoxymethyl)-1,4-butanediylzirconium (IV) dichloride, bis((2-oxoyl-3-(1,2,3,4,6,7,8,9-octahydroanthracen-5-yl)-5-(methyl)phenyl)-2-phenoxymethyl)-1,4-butanediylzirconium (IV) dibenzyl, bis((2-oxoyl-3-(dibenzo-1H-pyrrole-1-yl)-5-(methyl)phenyl)-2-phenoxymethyl)-1,4-butanediylzirconium (IV)dimethyl, bis((2-oxoyl-3-(dibenzo-1H-pyrrole-1-yl)-5-(methyl)phenyl)-2-phenoxymethyl)-1,4-butanediylzirconium (IV) dichloride, bis((2-oxoyl-3-(dibenzo-1H-pyrrole-1-yl)-5-(methyl)phenyl)-2-phenoxymethyl)-1,4-butanediylzirconium (IV) dibenzyl, bis((2-oxoyl-3-(1,2,3,4,6,7,8,9-octahydroanthracen-5-yl)-5-(methyl)phenyl)-2-phenoxy)-2,4-pentanediylzirconium (IV) dimethyl, bis((2-oxoyl-3-(1,2,3,4,6,7,8,9-octahydroanthracen-5-yl)-5-(methyl)phenyl)-2-phenoxy)-2,4-pentanediylzirconium (IV) dichloride, bis((2-oxoyl-3-(1,2,3,4,6,7,8,9-octahydroanthracen-5-yl)-5-(methyl)phenyl)-2-phenoxy)-2,4-pentanediylzirconium (IV) dibenzyl, bis((2-oxoyl-3-(dibenzo-1H-pyrrole-1-yl)-5-(methyl)phenyl)-2-phenoxy)-2,4-pentanediylzirconium (IV) dibenzyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylzirconium (IV) dimethyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylzirconium (IV) dichloride, bis((2-oxoyl-3-(1,2,3,4,6,7,8,9-octahydroanthracen-5-yl)-5-(methyl) phenyl)-2-phenoxymethyl)-methylenetrans-1,2-cyclohexanediylzirconium (IV) dibenzyl, bis((2-oxoyl-3-(dibenzo-1H-pyrrole-1-yl)-5-(methyl)phenyl)-2-phenoxymethyl)-methylenetrans-1,2-cyclohexanediylzirconium (IV) dimethyl, bis((2-oxoyl-3-(dibenzo-1H-pyrrole-1-yl)-5-(methyl)phenyl)-2-phenoxymethyl)-methylenetrans-1,2-cyclohexanediylzirconium (IV) dichloride, and bis((2-oxoyl-3-(dibenzo-1H-pyrrole-1-yl)-5-(methyl)phenyl)-2-phenoxymethyl)-methylenetrans-1,2-cyclohexanediylzirconium (IV) dibenzyl, bis((2-oxoyl-3-(4-methoxy-3,5-bis(1,1-dimethylethyl)phenyl)phenyl)-2-phenoxy)-1,4-n-butyizirconium (IV) dimethyl, bis((2-oxoyl-3-(4-methoxy-3,5-bis(1,1-dimethylethyl)phenyl) phenyl)-2-phenoxy)-1,4-n-butylzirconium (IV) dibenzyl, bis((2-oxoyl-3-(dibenzo-1H-pyrrole-1-yl)phenyl)-2-phenoxy)-1,2-ethylzirconium (IV) dimethyl, bis((2-oxoyl-3-(dibenzo-1H-pyrrole-1-yl)phenyl)-2-phenoxy)-1,2-ethyizirconium (IV) dibenzyl, bis((2-oxoyl-3-(dibenzo-1H-pyrrole-1-yl)phenyl)-2-phenoxy)-1,3-propylzirconium (IV) dimethyl, bis((2-oxoyl-3-(dibenzo-1H-pyrrole-1-yl)phenyl)-2-phenoxy)-1,3-propylzirconium (IV) dibenzyl, bis((2-oxoyl-3-(dibenzo-1H-pyrrole-1-yl)phenyl)-2-phenoxy)-1,4-n-butylzirconium (IV) dimethyl, bis((2-oxoyl-3-(dibenzo-1H-pyrrole-1-yl)phenyl)-2-phenoxy)-1,4-n-butyizirconium (IV) dibenzyl, bis((2-oxoyl-3-(3,6-bis(1,1-dimethylethyl)-9H-carbazolyl)phenyl)-2-phenoxy)-1,3-propylzirconium (IV) dimethyl, bis((2-oxoyl-3-(3,6-bis(1,1-dimethylethyl)-9H-carbazolyl)phenyl)-2-phenoxy)-1,3-propylzirconium (IV) dibenzyl, bis((2-oxoyl-3-(3,6-bis(1,1-dimethylethyl)-9H-carbazolyl)phenyl)-2-phenoxy)-1,4-n-butylzirconium (IV) dimethyl, bis((2-oxoyl-3-(3,6-bis(1,1-dimethylethyl)-9H-carbazolyl)phenyl)-2-phenoxy)-1,4-n-butyizirconium (IV) dibenzyl; (OC-6-33)-[[2,2'''-[1,4-Butanediylbis(oxy-κO)]bis[3'',5',5''-tris(1,1-dimethylethyl)[1,1':3',1''-terphenyl]-2'-olato-κO]](2-)]bis(phenylmethyl)hafnium, (OC-6-33)-[[2,2'''-[1,4-Butanediyibis(oxy-κO)]bis[3'',5',5''-tris(1,1-dimethylethyl)[1,1:3,1''-terphenyl]-2'-olato-κO]](2-)]bis(phenylmethyl)zirconium, preferably bis((2-oxoyl-3-(dibenzo-1H-pyrrole-1-yl)-5-(methyl)phenyl)-2-phenoxy)-2,4-pentanediylzirconium (IV) dimethyl, bis((2-oxoyl-3-(dibenzo-1H-pyrrole-1-yl)-5-(methyl)phenyl)-2-phenoxy)-2,4-pentanediylzirconium (IV) dichloride.

Co-Catalyst

The co-catalyst is selected from the group: MAO, DMAO, MMAO, SMAO or ammonium salts or trityl salts of fluorinated tetraarylborates or aryl borane, preferably MAO, MMAO, trityl tetrakis(pentafluorophenyl)borate dimethylanilinium or tri(alkyl)ammonium tetrakis (pentafluorophenyl)borate such as tri(n-butyl)ammonium tetrakis(pentafluorophenyl)borate, methyl di(alkyl)ammonium tetrakis(pentafluorophenyl)borate. More examples can be found in the review articles of Bochmann, Organometallics 2010, 29, 4711-4740 and Chen and Marks, Chem. Rev. 2000, 100, 1391-1434.

Methylaluminoxane or MAO as used in the present description may mean: a compound derived from the partial hydrolysis of trimethyl aluminum that serves as a co-catalyst for catalytic olefin polymerization.

Supported methylaluminoxane or SMAO as used in the present description may mean: a methylaluminoxane bound to a solid support.

Depleted methylaluminoxane or DMAO as used in the present description may mean: a methylaluminoxane from which the free trimethyl aluminum has been removed.

Modified methylaluminoxane or MMAO as used in the present description may mean: modified methylaluminoxane, viz. the product obtained after partial hydrolysis of trimethyl aluminum plus another trialkyl aluminum such as tri(isobutyl) aluminum or tri-n-octyl aluminum.

Fluorinated aryl borates or fluorinated aryl boranes as used in the present description may mean: a borate compound having three or four fluorinated (preferably perfluorinated) aryl ligands or a borane compound having three fluorinated (preferably perfluorinated) aryl ligands.

Optional Scavenger

A scavenger can optionally be added to the catalyst system in order to react with impurities that are present in the polymerization reactor, and/or in the solvent and/or monomer feed. This scavenger prevents poisoning of the catalyst during the olefin polymerization process. The optional scavenger is selected from the group: trimethyl aluminum, triethyl aluminum, triisobutyl aluminum, trihexyl aluminum, trioctyl aluminum, preferably triethyl aluminum.

Surprisingly, triethyl aluminum does not lead to severe chain transfer and does not inhibit the catalyst comprising the ligand-metal complex as describe above. This feature allows to use triethyl aluminum instead of triisobutyl aluminum, which is a great cost benefit.

Optional Chain Transfer Agent

Optional chain transfer agent is selected from the group: dihydrogen or $AlR^{10}_3$, $BR^{10}_3$ or $ZnR^{10}_2$, where each $R^{10}$ is independently selected from hydrogen or hydrocarbyl.

Polymerization Conditions

The polymerization according to the invention is performed in a solution process using a catalyst system as described above.

In the process, the polymerization conditions, like for example temperature, time, pressure, monomer concentration can be chosen within wide limits. The polymerization temperature is in the range from 100 to 250 °C, preferably 110 to 210 °C, more preferably 130 to 180 °C. The polymerization time is in the range of from 10 seconds to 20 hours, preferably from 1 minute to 2 hours, preferably 2 minutes to 1 hour, more preferably 5 to 30 minutes. The molecular weight of the polymer can be controlled by use of hydrogen or other chain transfer agents. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In an embodiment, a hindered phenol, such as for example butylated hydroxytoluene (BHT), may be added during the polymerization process, especially for example in an amount between 0.1 and 5 mol. equivalents of main group metal compound(s), used as scavenger and/or co-catalyst. This may contribute to increase molecular weight and/or comonomer incorporation.

Preferably, the amount of the functionalized olefin monomers in step a) is from 0.01 to 20 mol %, preferably from 0.02 to 15 mol % or from 0.05 to 10 mol %, or from 0.1 to 5 mol %, more preferably 0.02 to 2 mol %, with respect to the total molar amount of the olefin monomers and the functionalized olefin monomers.

The invention may involve a further addition of other additives such as a processing stabilizer (primary antioxidant) such as Irganox 1010.

The polymerization is quenched by treating the polymer solution obtained after the polymerization process with a quenching agent. Typical examples of quenching agents are, carbon monoxide, carbon dioxide, oxygen, water, alcohol or acidified or alkalified water or alcohol.

Optionally, a deashing step may be perform after the polymerization step in order to separate the aluminum-based residue derived from the co-catalyst and scavenger such as aluminum oxides and hydroxides, for example Al(O)OH, $Al(OH)_3$ and $Al_2O_3$, insoluble in water from the polymer by flocculation and settling, filtration including membrane separation, centrifugal separation, or adsorption.

It is noted that the invention relates to all possible combinations of features described herein, preferred in particular are those combinations of features that are present in the claims. It is in particular noted that the preferred materials or preferred amounts of materials as disclosed in the context of the process according to the invention equally apply to the functionalized olefin copolymer and/or the functionalized olefin copolymer composition.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

EXAMPLES

The invention is now elucidated by way of the following non-limiting examples.

$^1H$ NMR Characterization

The percentage of functionalization was determined by 1H NMR analysis carried out at 130 °C using deuterated tetrachloroethane (TCE-D2) as solvent and recorded in 5 mm tubes on a Varian Mercury spectrometer operating at a frequency of 400 MHz. Chemical shifts are reported in ppm versus tetramethylsilane and were determined by reference to the residual solvent protons.

High Temperature Size Exclusion Chromatography (HT-SEC)

The molecular weights, reported in $kg \cdot mol^{-1}$, and the PDI were determined by means of high temperature size exclusion chromatography, which was performed at 150 °C in a GPC-IR instrument equipped with an IR4 detector and a carbonyl sensor (PolymerChar, Valencia, Spain). Column set: three Polymer Laboratories 13 μm PLgel Olexis, 300×7.5 mm. 1,2-Dichlorobenzene (o-DCB) was used as eluent at a flow rate of 1 $mL \cdot min^{-1}$. The molecular weights and the corresponding PDIs were calculated from HT SEC analysis with respect to narrow polystyrene standards (PSS, Mainz, Germany).

Differential Scanning Calorimetry (DSC)

Thermal analysis was carried out on a DSC Q100 from TA Instruments at a heating rate of 5 $°C \cdot min^{-1}$. First and second runs were recorded after cooling down to ca. −40 °C. All copolymers were found to be amorphous as determined by DSC.

EXAMPLE ACCORDING TO THE INVENTION

The copolymerization experiments were carried out using a stainless steel BÜCHI reactor (0.3 L) filled with pentamethylheptane (PMH) solvent (0.15 L) using a stirring speed of 500 rpm. Catalyst and comonomer solutions were prepared in a glove box. For example, for entry 3, Table 1, the reactor was first heated to 40 °C followed by the addition of TiBA (1.0 M solution in toluene, 0.5 mL) and 11-bromo-1-undecene (1.0 M solution in toluene, 4 mmol). The reactor was charged at 40 °C with gaseous propylene (25 g) and the reactor was heated up to the desired polymerization temperature of 130 °C resulting in a partial propylene pressure of 15 bar. Once the set temperature was reached, the polymerization reaction was initiated by the injection of the pre-activated catalyst precursor bis((2-oxoyl-3-(dibenzo-1H-pyrrole-1-yl)-5-(methyl)phenyl)-2-phenoxy)-2,4-pentanediylhafnium (IV) dimethyl [CAS 958665-18-4]; other name hafnium [[2',2'''-[(1,3-dimethyl-1,3-propanediyl)bis(oxy-κO)]bis[3-(9H-carbazol-9-yl)-5-methyl[1,1'-biphenyl]-2-olato-κO]](2-)]dimethyl] (Hf—O4, 0.25 mg, 0.25 μmol) in MAO (30 wt % solution in toluene, 4.5 mmol). The reaction was stopped by pouring the polymer solution into an Erlenmeyer flask containing acidified isopropanol (2.5% v/v HCl, 500 mL) and Irganox 1010 (1.0 M, 0.5 mmol). The resulting suspension was stirred for about 4 h, filtered, washed with demineralized water/iPrOH (50 wt %, 2×500 mL) and dried at 80 °C in a vacuum oven, prior the addition of Irganox 1010 as antioxidant to obtain poly(propylene-co-1-bromo-undecene) (2.9 g).

TABLE 1

| Copolymerization of propylene with 11-bromo-1-undecene using Hf—O4 and Zr—O4 catalysts. | | | | | | | | | | | |
|---|---|---|---|---|---|---|---|---|---|---|---|
| Ref | T (° C.) | Catalyst | Co-monomer | Co-monomer (mM) | Time (min.) | Yield (g) | $M_n$ (kg/mol) | $M_w$ (kg/mol) | PDI | $T_m$ (° C.) | Co-momoner (mol %) |
| 1 | 130 | HfO4 | n.a. | n.a. | 10 | 6.3 | 46.2 | 152.5 | 3.3 | 149.8 | 0 |
| 2 | | HfO4 | C11Br | 2 | 10 | 3.5 | 56.3 | 236.5 | 4.2 | 144.9 | 0.21 |
| 3 | | HfO4 | C11Br | 4 | 10 | 2.9 | 35.6 | 117.5 | 3.3 | 142.8 | 0.23 |
| 4 | | HfO4 | C11Br | 6 | 10 | 3.3 | 29.6 | 139.1 | 4.7 | 140.2 | 0.34 |
| 5 | | ZrO4 | n.a. | n.a. | 10 | 3.4 | 37.3 | 179.1 | 4.8 | 128.2 | 0 |
| 6 | | ZrO4 | C11Br | 4 | 10 | 2.6 | 29.8 | 116.2 | 3.9 | 119.6 | 0.27 |

Conditions:

Reactions performed in BÜCHI reactors (0.3 L) using bis((2-oxoyl-3-(dibenzo-1H-pyrrole-1-yl)-5-(methyl)phenyl)-2-phenoxy)-2,4-pentanediylhafnium (IV) dimethyl (Hf—O4=0.25 μmol) or bis((2-oxoyl-3-(dibenzo-1H-pyrrole-1-yl)-5-(methyl)phenyl)-2-phenoxy)-2,4-pentanediylzirconium (IV) dimethyl (Zr-04=0.1 μmol), propylene partial pressure ~15 bar, pentamethylheptane=0.15 L, MAO (30 wt % solution in toluene)=4.5 mmol, additional amount of TiBA (1.0 M solution in toluene, 0.5 mL) was added as scavenger.

The yield determined using the weight of polymer obtained after filtration and drying in vacuum oven overnight at 80 °C.

n.a.=not applicable.

COMPARATIVES EXAMPLES

The following comparatives examples are performed with no hafnium or zirconium complex of a polyvalent aryloxyether catalysts according to the invention:

rac-$Me_2Si$(2-Me-4-Ph-Ind)$_2ZrCl_2$ catalyst (Zr-metallocene)

rac-$Me_2Si$(2-Me-4-Ph-Ind)$_2HfCl_2$ catalyst (Hf-metallocene)

TABLE 2

| Copolymerization of propylene with 11-bromo-1-undecene using rac-$Me_2Si$(2-Me-4-Ph-Ind)$_2ZrCl_2$ catalyst (A) and rac-$Me_2Si$(2-Me-4-Ph-Ind)$_2HfCl_2$ catalyst (B). | | | | | | | | | |
|---|---|---|---|---|---|---|---|---|---|
| Ref | T (° C.) | Catalyst | C11Br (mM) | Time (min.) | Yield (g) | $M_n$ (kg/mol) | $M_w$ (kg/mol) | PDI | $T_m$ (° C.) |
| CE1 | 130 | A | — | 10 | 9.2 | 6.2 | 16.2 | 2.6 | 129.3 |
| CE2 | | A | 5 | 10 | 3.3 | 8.9 | 29.4 | 3.3 | 127.9 |
| CE3 | | B | — | 10 | 1.5 | 7.7 | 31.6 | 4.1 | 127.8 |
| CE4 | | B | 5 | 10 | 1.1 | 3.4 | 12.6 | 3.7 | 128.2 |

Conditions: Reactions performed in BUCHI reactors (0.3 L) using rac-$Me_2Si$(2-Me-4-Ph-Ind)$_2ZrCl_2$ (A)=3.2 μmol and rac-$Me_2Si$(2-Me-4-Ph-Ind)$_2HfCl_2$ (B)=5.5 μmol, propylene partial pressure ~15 bar, pentamethylheptane=0.15 L, MAO (30 wt % solution in toluene)=4.5 mmol, additional amount of TiBA (1.0 M solution in toluene, 0.5 mL) was added as scavenger.

The yield determined using the weight of polymer obtained after filtration and drying in vacuum oven overnight at 80 °C.

CE1 is the reference propylene polymerization with rac-$Me_2Si$(2-Me-4-Ph-Ind)$_2ZrCl_2$ catalyst.

CE3 is the reference propylene polymerization with rac-$Me_2Si$(2-Me-4-Ph-Ind)$_2HfCl_2$ catalyst.

The invention claimed is:

1. A process for solution copolymerization to obtain functionalized polyolefin comprising at least the following step:

copolymerizing at least one olefin monomer and at least one functionalized olefin monomer in the presence of a catalyst system, wherein the at least one olefin monomer is represented by $CHR^1{=}CHR^2$, wherein $R^1$ and $R^2$ are each independently hydrogen or an alkyl group having 1 to 6 carbon atoms, wherein $R^1$ and $R^2$ may together form a ring structure, wherein the at least one functionalized olefin monomer is represented by a structure according to Formula (I):

(I)

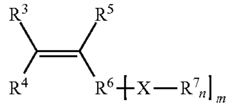

wherein $R^3$, $R^4$, and $R^5$ are each independently H or a hydrocarbyl with 1 to 16 carbon atoms, wherein $R^6$—[X—$(R^7)_n]_m$ is a polar functional group containing m heteroatom containing functionalities X—$(R^7)_n$, in which m is an integer between 1 and 10, with the provisos that when n=0 (therefore there is no $R^7$), X is F, Cl, Br, or I, and when n=2, X is N and each of the $R^7$ is independently a hydrocarbyl with 1 to 16 carbon atoms, wherein $R^6$ is either —C($R^8$)($R^9$)— or a plurality of —C($R^8$)($R^9$)— groups, wherein $R^8$, and $R^9$ are each independently H or a hydrocarbyl with 1 to 16 carbon atoms and $R^6$ comprises 1 to 10 carbon atoms, wherein $R^4$ and $R^6$ may together form a ring structure that is functionalized with one or multiple X—$(R^7)_n$, where X is attached to either a main chain or side chain of $R^6$, and wherein the catalyst system comprises a hafnium or zirconium complex of a polyvalent aryloxyether selected from:

bis((2-oxoyl-3-(1,2,3,4,6,7,8,9-octahydroanthracen-5-yl)-5-(methyl)phenyl)-2-phenoxy)-1,3-propanediylhafnium (IV) dimethyl, bis((2-oxoyl-3-(1,2,3,4,6,7,8,9-octahydroanthracen-5-yl)-5-(methyl)phenyl)-2-phenoxy)-1,3-propanediylhafnium (IV) dichloride, bis((2-oxoyl-3-(1,2,3,4,6,7,8,9-octahydroanthracen-5-yl)-5-(methyl)phenyl)-2-phenoxy)-1,3-propanediylhafnium (IV) dibenzyl, bis((2-oxoyl-3-(dibenzo-1H-pyrrole-1-yl)-5-(methyl)phenyl)-2-phenoxy)-1,3-propanediylhafnium (IV) dimethyl, bis((2-oxoyl-3-(dibenzo-1H-pyrrole-1-yl)-5-(methyl)phenyl)-2-phenoxy)-1,3-propanediylhafnium (IV) dichloride, bis((2-oxoyl-3-(dibenzo-1H-pyrrole-1-yl)-5-(methyl)phenyl)-2-phenoxy)-1,3-propanediylhafnium (IV) dibenzyl, bis((2-oxoyl-3-(1,2,3,4,6,7,8,9-octahydroanthracen-5-yl)-5-(methyl)phenyl)-2-phenoxymethyl)-1,4-butanediylhafnium (IV) dimethyl, bis((2-oxoyl-3-(1,2,3,4,6,7,8,9-octahydroanthracen-5-yl)-5-(methyl)phenyl)-2-phenoxymethyl)-1,4-butanediylhafnium (IV) dichloride, bis((2-oxoyl-3-(1,2,3,4,6,7,8,9-octahydroanthracen-5-yl)-5-(methyl)phenyl)-2-phenoxymethyl)-1,4-butanediylhafnium (IV) dibenzyl, bis((2-oxoyl-3-(dibenzo-1H-pyrrole-1-yl)-5-(methyl)phenyl)-2-phenoxymethyl)-1,4-butanediylhafnium (IV) dimethyl, bis((2-oxoyl-3-(dibenzo-1H-pyrrole-1-yl)-5-(methyl)phenyl)-2-phenoxymethyl)-1,4-butanediylhafnium (IV) dichloride, bis((2-oxoyl-3-(dibenzo-1H-pyrrole-1-yl)-5-(methyl)phenyl)-2-phenoxymethyl)-1,4-butanediylhafnium (IV) dibenzyl, bis((2-oxoyl-3-(1,2,3,4,6,7,8,9-octahydroanthracen-5-yl)-5-(methyl)phenyl)-2-phenoxy)-2,4-pentanediylhafnium (IV) dimethyl, bis((2-oxoyl-3-(1,2,3,4,6,7,8,9-octahydroanthracen-5-yl)-5-(methyl)phenyl)-2-phenoxy)-2,4-pentanediylhafnium (IV) dichloride, bis((2-oxoyl-3-(1,2,3,4,6,7,8,9-octahydroanthracen-5-yl)-5-(methyl)phenyl)-2-phenoxy)-2,4-pentanediylhafnium (IV) dibenzyl, bis((2-oxoyl-3-(dibenzo-1H-pyrrole-1-yl)-5-(methyl)phenyl)-2-phenoxy)-2,4-pentanediylhafnium (IV) dimethyl, bis((2-oxoyl-3-(dibenzo-1H-pyrrole-1-yl)-5-(methyl)phenyl)-2-phenoxy)-2,4-pentanediylhafnium (IV) dichloride, bis((2-oxoyl-3-(dibenzo-1H-pyrrole-1-yl)-5-(methyl)phenyl)-2-phenoxy)-2,4-pentanediylhafnium (IV) dibenzyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dimethyl, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dichloride, bis((2-oxoyl-3-(1,2,3,4,6,7,8,9-octahydroanthracen-5-yl)-5-(methyl)phenyl)-2-phenoxymethyl)-methylenetrans-1,2-cyclohexanediylhafnium (IV) dibenzyl, bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl, bis((2-oxoyl-3-(dibenzo-1H-pyrrole-1-yl)-5-(methyl)phenyl)-2-phenoxymethyl)-methylenetrans-1,2-cyclohexanediylhafnium (IV) dichloride, and bis((2-oxoyl-3-(dibenzo-1H-pyrrole-1-yl)-5-(methyl)phenyl)-2-phenoxymethyl)-methylenetrans-1,2-cyclohexanediylhafnium (IV) dibenzyl, bis((2-oxoyl-3-(dibenzo-1H-pyrrole-1-yl)phenyl)-2-phenoxy)-1,3-propylhafnium (IV) dibenzyl, bis((2-oxoyl-3-(dibenzo-1H-pyrrole-1-yl)phenyl)-2-phenoxy)-1,4-n-butylhafnium (IV) dimethyl, bis((2-oxoyl-3-(dibenzo-1H-pyrrole-1-yl)phenyl)-2-phenoxy)-1,4-n-butylhafnium (IV) dibenzyl, bis((2-oxoyl-3-(3,6-bis(1,1-dimethylethyl)-9H-carbazolyl)phenyl)-2-phenoxy)-1,3-propylhafnium (IV) dimethyl, bis((2-oxoyl-3-(3,6-bis(1,1-dimethylethyl)-9H-carbazolyl)phenyl)-2-phenoxy)-1,3-propylhafnium (IV) dibenzyl, bis((2-oxoyl-3-(3,6-bis(1,1-dimethylethyl)-9H-carbazolyl)phenyl)-2-phenoxy)-1,4-n-butylhafnium (IV) dimethyl, bis((2-oxoyl-3-(3,6-bis(1,1-dimethylethyl)-9H-carbazolyl)phenyl)-2-phenoxy)-1,4-n-butylhafnium (IV) dibenzyl, bis((2-oxoyl-3-(4-methoxy-3,5-bis(1,1-dimethylethyl)phenyl)phenyl)-2-phenoxy)-1,4-n-butylhafnium (IV) dimethyl, bis((2-oxoyl-3-(4-methoxy-3,5-bis(1,1-dimethylethyl)phenyl)phenyl)-2-phenoxy)-1,4-n-butylhafnium (IV) dibenzyl, bis((2-oxoyl-3-(dibenzo-1H-pyrrole-1-yl)phenyl)-2-phenoxy)-1,2-ethylhafnium (IV) dimethyl, bis((2-oxoyl-3-(dibenzo-1H-pyrrole-1-yl)phenyl)-2-phenoxy)-1,2-ethylhafnium (IV) dibenzyl, or bis((2-oxoyl-3-(dibenzo-1H-pyrrole-1-yl)phenyl)-2-phenoxy)-1,3-propylhafnium (IV) dimethyl; and a co-catalyst selected from: MAO, DMAO, MMAO, SMAO or ammonium salts or trityl salts of fluorinated tetraarylborates, and optionally, a scavenger selected from: trimethyl aluminum, triethyl aluminum, triisobutyl aluminum, trihexyl aluminum, or trioctyl aluminum and optionally, a chain transfer agent selected from: dihydrogen or $AlR^{10}_3$, $BR^{10}_3$ or $MgR^{10}_2$ or $ZnR^{10}_2$, where each $R^{10}$ is independently hydrogen or a hydrocarbyl.

2. The process according to claim 1, wherein after the copolymerizing, a deashing step is performed to separate and aluminum-based residue derived from the co-catalyst and scavenger from the functionalized polyolefin.

3. The process according to claim 1, wherein the at least one olefin monomer is ethylene, propylene, 1-butene, 3-methyl-1-butene, 1-pentene, 4-methyl-1-pentene, 1-hexene, vinyl cyclohexane, 1-octene, norbornene, vinylidene-norbornene, or ethylidene-norbornene, or wherein the at least one olefin monomer is propylene and/or 1-hexene.

4. The process according to claim 1, wherein the at least one functionalized olefin monomers is allyl chloride, allyl bromide, 4-chloro-1-butene, 4-bromo-1-butene, 4-iodo-1-butene, 3-bromo-3-methyl-1-butene, 3-chloro-3-methyl-1-butene, 3-iodo-3-methyl-1-butene, 5-bromo-1-pentene, 5-chloro-1-pentene, 5-iodo-1-pentene, 5-chloro-1-hexene, 5-bromo-1-hexene, 5-iodo-1-hexene, 6-chloro-1-hexene, 6-bromo-1-hexene, 6-iodo-1-hexene, 5,6-dichloro-1-hexene, 5,6-dibromo-1-hexene, 5,6-diiodo-1-hexene, 6,6-dichloro-1-hexene, 6,6-dibromo-1-hexene, 6,6-diiodo-1-hexene, 5-bromo-5-methyl-1-hexene, 5-chloro-5-methyl-1-hexene, 7-bromo-1-heptene, 7-iodo-1-heptene, 6-bromo-1-heptene, 6-chloro-1-heptene, 6-iodo-1-heptene, 6,7-dichloro-1-heptene, 6,7-diiodo-1-heptene, 6-bromo-6-methyl-1-heptene, 6-chloro-6-methyl-1-heptene, 6-iodo-6-methyl-1-heptene, 8-bromo-1-octene, 8-chloro-1-octene, 8-iodo-1-octene, 7-bromo-1-octene, 7-chloro-1-octene, 7,8-dichloro-1-heptene, 7,8-diiodo-1-heptene, 11-bromo-1-undecene, 11-chloro-1-undecene, 11-iodo-1-undecene, 5-chloro-bicyclo(2.2.1) hept-2-ene, 5-bromo-bicyclo(2.2.1) hept-2-ene, 5-bromomethyl-bicyclo(2.2.1) hept-2-ene, 5-chloromethyl-bicyclo(2.2.1) hept-2-ene, 5-iodomethyl-bicyclo(2.2.1) hept-2-ene, 5-(2-bromoethyl)-bicyclo(2.2.1) hept-2-ene, 5-(2-chloroethyl)-bicyclo(2.2.1) hept-2-ene, 5-(3-bromopropyl)-bicyclo(2.2.1) hept-2-ene, 5-(3-bromopropyl)-bicyclo(2.2.1) hept-2-ene, N,N-diethyl-N-(butenyl)amine, N,N-di-n-propyl-N-(butenyl)amine, N,N-di-isopropyl-N-(butenyl)amine, N,N-diethyl-N-(pentenyl)amine, N,N-di-n-propyl-N-(pentenyl)amine, N,N-di-isopropyl-N-(pentenyl)amine, N,N-di-isopropyl-N-(3-methyl-5-hexenyl) amine, N,N-diethyl-N-(hexenyl)amine, N,N-di-isopropyl-N-(hexenyl)amine, N,N-di-n-propyl-N-(hexenyl)amine, N,N-diethyl-N-(heptenyl)amine, N,N-di-isopropyl-N-(heptenyl)amine, N,N-di-n-propyl-N-(heptenyl)amine, N,N-diethyl-N-(octenyl)amine, N,N-di-n-propyl-N-(octenyl) amine, N,N-di-isopropyl-N-(octenyl)amine, N,N-diethyl-N-(undecenyl)amine, N,N-di-n-propyl-N-(undecenyl)amine, N,N-di-isopropyl-N-(undecenyl)amine, 5-norbornene-2-N,N-diethylamine, 5-norbornene-2-N,N-(diethyl)methylamine, 5-norbornene-2-N,N-di(n-propyl)amine, or 5-norbornene-2-N,N-(diisopropyl)methylamine.

5. The process according to claim 1, wherein an amount of the at least one functionalized olefin monomer in the functionalized polyolefin from 0.01 to 20 mol %, with respect to a total molar amount of the olefin monomer and functionalized olefin monomer in the functionalized polyolefin.

6. The process according to claim 1 wherein a first and a second olefin monomer are used to be copolymerized with the at least one functionalized olefin monomer, wherein the first and second olefin monomer are different and wherein an amount of the first olefin monomer is from 20 to 80 mol % and an amount of second olefin monomer is from 80 to 20 mol %, based on a total molar amount of first and second olefin monomer.

7. The process according to claim 1 wherein at least one olefin monomer is propylene used in an amount of at least 50 wt %, with respect to a total weight of olefin monomer and functionalized olefin monomer.

8. The process according to claim 1 wherein at least one olefin monomer is ethylene used in an amount of at least 50 wt %, with respect to a total weight of olefin monomer and functionalized olefin monomer.

9. The process according to claim 6, wherein the first olefin monomer is propylene or ethylene and the second olefin monomer is 1-hexene, 1-octene or norbornene, or the first olefin monomer is propylene and the second olefin monomer is ethylene.

10. The process according to claim 1, wherein a functionalized terpolymer is obtained.

* * * * *